US010684365B2

(12) United States Patent
Bunch et al.

(10) Patent No.: US 10,684,365 B2
(45) Date of Patent: Jun. 16, 2020

(54) DETERMINING A LOCATION OF A RUNWAY BASED ON RADAR SIGNALS

(71) Applicant: Honeywell International Inc., Morris Plains, NJ (US)

(72) Inventors: Brian P. Bunch, Snohomish, WA (US); David W. Syms, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 326 days.

(21) Appl. No.: 15/682,763

(22) Filed: Aug. 22, 2017

(65) Prior Publication Data
US 2019/0064341 A1 Feb. 28, 2019

(51) Int. Cl.
*G01S 13/86* (2006.01)
*G01S 13/91* (2006.01)
(Continued)

(52) U.S. Cl.
CPC ............... *G01S 13/86* (2013.01); *G01S 1/12* (2013.01); *G01S 13/4472* (2013.01);
(Continued)

(58) Field of Classification Search
CPC ...... G01S 13/86; G01S 13/87; G01S 13/4472; G01S 1/12; G01S 13/913; G01S 13/956;
(Continued)

(56) References Cited

U.S. PATENT DOCUMENTS 3,384,893 A 5/1968 Prestwood
4,017,856 A 4/1977 Wiegand
(Continued)

FOREIGN PATENT DOCUMENTS

EP 0223961 A1 6/1987
EP 0273326 B1 7/1988
(Continued)

OTHER PUBLICATIONS

Ahmad et al., "Design of a Compact X-Band Substrate Integrated Waveguide Directional Coupler," International Journal of Engineering and Technology, vol. 5, No. 2, Apr.-May 2013, pp. 1905-1911.
(Continued)

*Primary Examiner* — Frank J McGue
(74) *Attorney, Agent, or Firm* — Shumaker & Sieffert, P.A.

(57) ABSTRACT

In some examples, a system includes a radar device configured to transmit first X-band radar signals in a weather mode and receive first return X-band radar signals in the weather mode. In some examples, the radar device is further configured to transmit second X-band radar signals in a landing mode and receive second return X-band radar signals in the landing mode. In some examples, the system also includes processing circuitry configured to detect, in the weather mode, weather formations based on the first return X-band radar signals. In some examples, the processing circuitry is further configured to determine, in the landing mode, a position of a transponder based on the second return X-band radar signals received by the radar device and determine a location of a runway based on the position of the transponder.

20 Claims, 12 Drawing Sheets

(51) Int. Cl.
*G01S 13/95* (2006.01)
*G01S 13/87* (2006.01)
*G01S 1/12* (2006.01)
*G01S 13/44* (2006.01)
*H01Q 21/00* (2006.01)

(52) U.S. Cl.
CPC ............ *G01S 13/87* (2013.01); *G01S 13/872* (2013.01); *G01S 13/913* (2013.01); *G01S 13/953* (2013.01); *G01S 13/955* (2013.01); *G01S 13/956* (2013.01); *H01Q 21/0075* (2013.01)

(58) Field of Classification Search
CPC .... G01S 13/955; G01S 13/953; G01S 13/872; H01Q 21/0075
USPC .......................................................... 342/33
See application file for complete search history.

(56) References Cited

U.S. PATENT DOCUMENTS

| | | | |
|---|---|---|---|
| 4,050,070 A | | 9/1977 | Beno et al. |
| 4,103,300 A | | 7/1978 | Gendreu et al. |
| 4,429,312 A | | 1/1984 | Chisholm |
| 4,612,543 A | | 9/1986 | Devries |
| 4,940,986 A | * | 7/1990 | Huguenin ............... G01S 1/047 342/33 |
| 5,475,393 A | * | 12/1995 | Heinzerling ............ G01S 1/14 342/410 |
| 7,619,556 B1 | | 11/2009 | Mccusker |
| 7,898,463 B1 | * | 3/2011 | Mueller ................ G01S 13/765 342/33 |
| 8,384,582 B2 | | 2/2013 | Chiassarini et al. |
| 8,669,834 B2 | | 3/2014 | Cheng et al. |
| 9,531,085 B2 | | 12/2016 | Miraftab et al. |
| 9,720,082 B1 | * | 8/2017 | Dana ....................... G01S 13/95 |
| 2013/0169466 A1 | * | 7/2013 | Frederick ............. G08B 13/248 342/22 |
| 2015/0234035 A1 | | 8/2015 | Lohoefener et al. |
| 2016/0142095 A1 | | 5/2016 | Pos et al. |
| 2016/0282131 A1 | | 9/2016 | Palfreyman |
| 2017/0003377 A1 | | 1/2017 | Menge |
| 2017/0016974 A1 | | 1/2017 | Djerafi et al. |
| 2017/0104276 A1 | | 4/2017 | Vacanti et al. |
| 2017/0160389 A1 | | 6/2017 | Vacanti |
| 2017/0227633 A1 | | 8/2017 | Bunch |

FOREIGN PATENT DOCUMENTS

| | | |
|---|---|---|
| EP | 0744628 A2 | 11/1996 |
| FR | 2828935 A1 | 2/2003 |
| WO | 9004795 A | 5/1990 |
| WO | 2015161849 A1 | 10/2015 |
| WO | 2016178609 A1 | 11/2016 |

OTHER PUBLICATIONS

Collado, et al., "X-band Substrate Integrated Waveguide (SIW) Active Antenna Self-Oscillating Mixer (SOM)," Jul. 8-14, 2012, IEEE, 2 pp.

Liu, et al., "A Fully Integrated X-Band Phased-Array Transceiver in 0.13-μm SiGe BiCMOS Technology," IEEE Transactions on Microwave Theory and Techniques, vol. 64, No. 2, Feb. 2016, pp. 575-584.

Nawaz, et al., "Substrate Integrated Waveguide (SIW) to Microstrip Transition at X-Band," Proceedings of the 2014 International Conference on Circuits, (Applicant points out, in accordance with MPEP 609.04(a), that the year of publication, 2014, is sufficiently earlier than the effective U.S. filing date, Aug. 21, 2017, so that the particular month of publication is not in issue.) pp. 61-63.

Vala, et al., "Wideband Directional Coupler for X-band using SIW Technique," ResearchGate, International Journal of Engineering Research & Technology, vol. 4, Issue 11, Nov. 2015, 4 pp.

"X-band transmitter can transmit up to 13.3 GB per pass with a 5 m station, designed for LEO CubSat & Nanosatelites," Syrlinks, retrieved on Jan. 23, 2017 from http://www.syrlinks.com/en/products/cubesats/hdr-x-band-transmitter.html, 3 pp.

"Approval of Offshore Standard Approach Procedures, Airborne Radar Approaches, and Helicopter En Route Descent Areas," Advisory Circular, Federal Aviation Administration, Apr. 12, 1999, 58 pp.

"SeaBeacon® 2," System 6 Racon, www.tidelandsignal.com, May 2016, 4 pp.

"WM-RBII Dual Band Frequency Agile Radar Beacon (RACON)," accessed on Jan. 31, 2017, www.wealthmarine.com.sg, 3 pp.

Extended Search Report from counterpart European Application No. 18190330.3, dated Jan. 4, 2019, 7 pp.

Office Action from U.S. Appl. No. 15/424,388, dated May 22, 2019, 12 pp.

Response to Extended Search Report dated Jan. 4, 2019, from counterpart European Application No. 18190330.3, filed Aug. 21, 2019, 17 pp.

Response to Office Action from U.S. Appl. No. 15/424,388, dated May 22, 2019, 9 pp., filed on Aug. 19, 2019.

* cited by examiner

DETERMINING A LOCATION OF A RUNWAY BASED ON RADAR SIGNALS

TECHNICAL FIELD

This disclosure relates to radar systems for vehicles.

BACKGROUND

X-band radar beacon transponders may be used for navigation. X-band radar uses X-band transmissions, which are radar signals having frequencies between eight and twelve gigahertz. X-band radar beacon transponders (also referred to as "X-band beacons") may be configured to receive an incoming X-band radar signal, and respond to receiving that incoming radar transmission by transmitting a second radar signal. The X-band radar transmission frequency band may be the same radar frequency band as is often used for weather radar, including for vehicle weather radar. Thus, an X-band beacon may be put in a desired position, and a vehicle's weather radar may double as a navigation aid, by being able to send an X-band transmission to ping the X-band beacon, and receive an X-band response signal at indicating the position of the X-band beacon.

SUMMARY

This disclosure is directed to systems, devices, and methods for determining the location of a runway by radar signals transmitted from a vehicle. A radar system of this disclosure includes a radar device and processing circuitry configured to operate in a weather mode and in a landing mode. In both modes, the radar device may be configured to transmit and receive X-band radar signals. In the weather mode, the processing circuitry may be configured to detect weather formations based on the return radar signals. In the landing mode, the processing circuitry may be configured to determine positions of one or more transponders based on the return radar signals. The processing circuitry may then be configured to determine the location of a runway based on the transponder positions.

In some examples, a system includes a radar device configured to transmit first X-band radar signals in a weather mode and receive first return X-band radar signals in the weather mode. The radar device is further configured to transmit second X-band radar signals in a landing mode and receive second return X-band radar signals in the landing mode. The system also includes processing circuitry configured to detect, in the weather mode, weather formations based on the first return X-band radar signals. The processing circuitry is further configured to determine, in the landing mode, a position of a transponder based on the second return X-band radar signals received by the radar device and determine a location of a runway based on the position of the transponder.

In some examples, a method includes causing a radar device to transmit first X-band radar signals in a weather mode and causing the radar device to receive first return X-band radar signals in the weather mode. The method also includes causing the radar device to transmit second X-band radar signals in a landing mode and causing the radar device to receive second return X-band radar signals in the landing mode. The method further includes detecting, in the weather mode, weather formations based on the first return X-band radar signals received by the radar device. The method includes determining, in the landing mode, a position of a transponder based on the second return X-band radar signals received by the radar device and determining a location of a runway based on the position of the transponder.

In some examples, a device includes a computer-readable medium having executable instructions stored thereon, wherein the instructions are configured to be executable by one or more processors for causing the one or more processors to cause a radar device to transmit first X-band radar signals and cause the radar device to receive first return X-band radar signals. The instruction executable instructions further cause the one or more processors to cause the radar device to transmit second X-band radar signals and cause the radar device to receive second return X-band radar signals. The instruction executable instructions further cause the one or more processors to detect, in a weather mode, weather formations based on the first return X-band radar signals. The instruction executable instructions further cause the one or more processors to determine, in the landing mode, a position of a transponder based on the second return X-band radar signals received by the radar device and determine a location of a runway based on the position of the transponder.

The details of one or more examples are set forth in the accompanying drawings and the description below. Other features, objects, and advantages will be apparent from the description and drawings, and from the claims.

DETAILED DESCRIPTION

Figure 1:
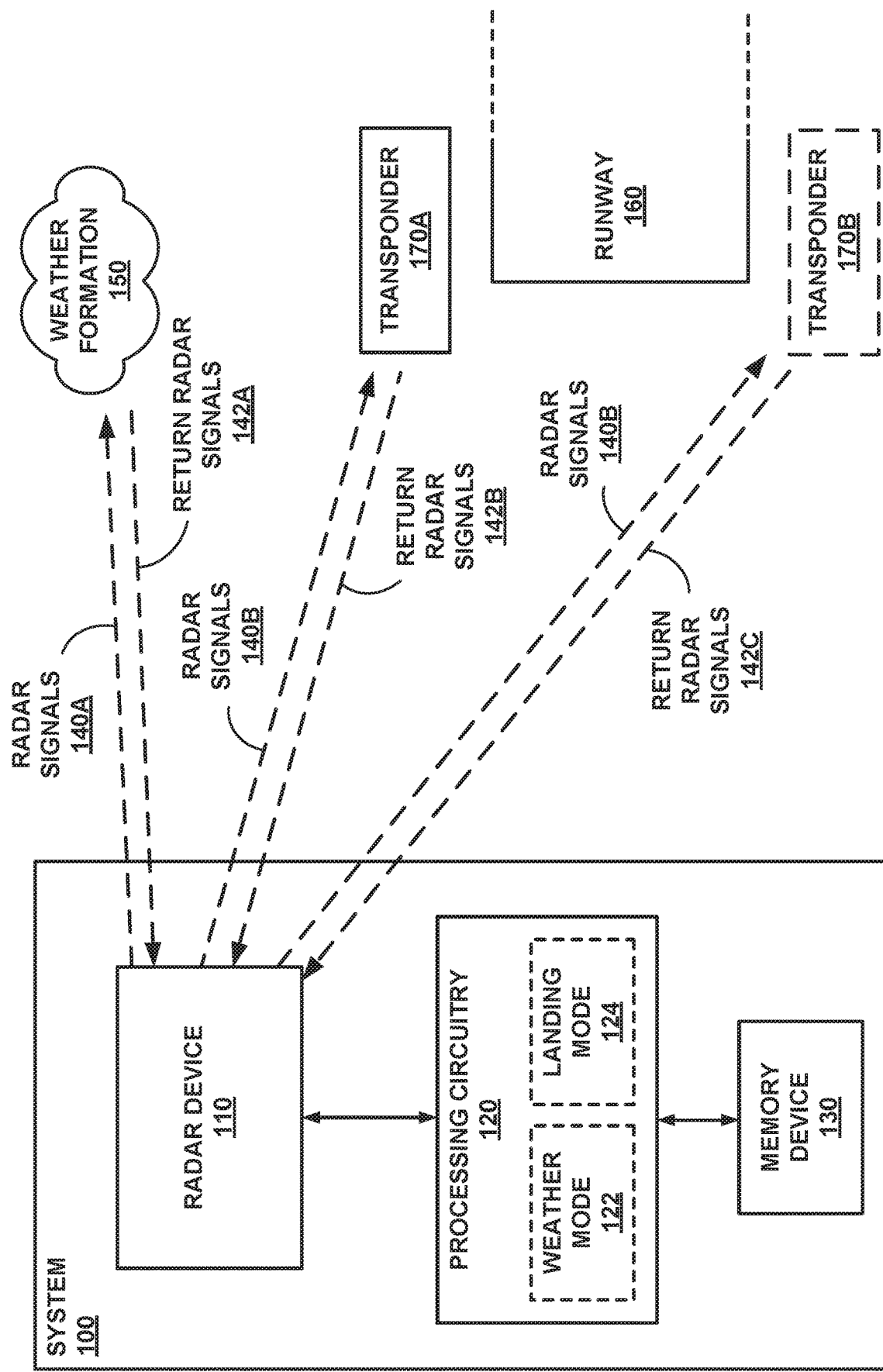
FIG. 1 is a conceptual block diagram of a system for determining a location of a runway based on radar signals, in accordance with some examples of this disclosure.

Various examples are described below generally directed to devices, systems, and methods for determining a position of a runway by transmitting radar signals from a system. The system may include a radar device that is configured to transmit and receive radar signals in two or more modes, such as a weather mode and a landing mode. In the landing mode, the processing circuitry of the system may determine the positions of one or more transponders based on return X-band radar signals. The processing circuitry may also be configured to determine the location of a runway based on the transponder positions. The system may therefore be able to determine a runway location even in low- and zero-visibility conditions.

A vehicle may be configured to determine the location of a runway using Global Navigation Satellite System (GNSS) (e.g., Global Positioning System (GPS)) and/or visually (e.g., by an operator through a windshield). For operations in low-visibility conditions, it may be desirable for the vehicle to be able to determine the location of the runway independently of GNSS and visual cues. Some existing systems, for example, include infrared cameras that are very expensive, heavy, and difficult to integrate.

A system of this disclosure may be configured to determine the location and orientation of a runway threshold completely independent of any navigation system (e.g., GNSS) or any database that stores runway locations, including latitude, longitude, and altitude. An existing system may be modified to include these new capabilities without installing any extra hardware on the vehicle. Existing X-band weather radars may have difficulty discriminating between intended reflectors (or scatterers) and background clutter. However, the transponders of this disclosure may be configured to reply at a different frequency than any naturally occurring echoes from terrain or man-made objects. In terms of additional hardware, each runway needs only one transponders that are relatively inexpensive when compared to equipping each vehicle of a fleet with redundant low-visibility landing systems. The system of this disclosure may also be compatible with future electronically steered antenna radar systems.

A system of this disclosure may include a low peak-power solid-state X-band weather radar that is configured to interoperate with solid-state compatible (SSC) beacon transponders positioned near a runway. The SSC beacon transponder may facilitate determination of runway location during low-visibility conditions, independent of navigation sources such as GNSS. Vehicle operators may benefit from a means of accurately determining runway location for low-visibility approaches and landings. Although there are navigation systems such as GNSS, it may be desirable for a vehicle to have an additional and independent means of locating the runway to ensure safe approaches in the event of undetected GNSS failure (including hostile denial of GNSS service) or runway coordinate database errors.

As introduced above, some existing systems utilize infrared cameras to provide an image of the runway overlaid on an image on the display rendered using database information and GNSS aircraft location. These existing systems present the image to the vehicle operator and/or crew. However, infrared systems tend to be very expensive, heavy, and take up a large volume of space to install, thus limiting the space available for other aircraft systems (such as weather radar). Existing systems have also attempted to use unaided weather radar to determine runway location by keying on the radar returns from approach light standards. However, existing X-band weather radars are not able to reliably discriminate the lighting standards from background clutter.

A system of this disclosure may use SSC beacon transponders at suitable locations near runway thresholds. Weather radar onboard a vehicle, including a radar device, may be configured to interoperate with the transponders and determine the location of the runway based on return radar signals. The weather radar, along with processing circuitry, can determine the relative location of the runway location. Additionally or alternatively, the weather radar can provide the transponder range and bearing information to another onboard system, such as a flight management system (FMS), which may be configured to determine the location of the runway.

The new system may be configured to determine runway threshold location completely independent of any navigation system or any database. The system may also be configured to provide a solution which can be implemented with little or no extra hardware to be installed on the aircraft. The system may avoid the issue of X-band weather radars having to discriminate between intended reflectors (or scatterers) and background clutter since they reply at a different frequency than any naturally occurring echoes from terrain or man-made objects.

The system may operate with a high signal-to-noise ratio (SNR) that will enable sub-resolution techniques to be used to improve bearing information, as compared to bearing resolution obtainable from existing systems. Existing system may have bearing resolution that is limited to the airborne aircraft weather radar antenna beamwidth. A system of this disclosure may include an inexpensive system that is deployed at each runway, rather than an expensive system installed on each vehicle that intends to perform low-visibility landings. The system may also be compatible with future electronically steered antenna radar systems.

In some examples, the SSC beacon transponders may be incorporated as part of the approach light systems on or near (e.g., off to the sides of) the runway. The approach light systems may include access to a power supply for the SSC beacon transponder. For increased accuracy, two SSC beacon transponders can be deployed with optimal geometry. The optimal geometry may be similar to how FMS navigation systems use distance measuring equipment in a suitable geometry to provide highly accurate aircraft position information. This method may be referred to as a hyperbolic navigation algorithm or a rho-rho navigation algorithm, where the Greek letter "rho" is commonly used in polar coordinates to refer to radial distance between two points and is especially effective in cases where range information may be more accurate than bearing information.

A transponder of this disclosure may be portable and may include a superheterodyne receiver and five hundred Watts of peak power for long-range omnidirectional service. The transponder may be configured to operate in the range of 9.3 GHz to 9.5 GHz and may be optimized for use with aircraft weather radars with landing mode or beacon mode. The transponder may include a weather-resistant rugged transit case and may be non-responsive to short pulse marine surface radars. The transponder may include a code switch, an automatic standby bypass switch, and sensitivity control that are accessible by opening the quick-release hinged lid. The transponder may include switch selectable time-coded reply signals and a power-saving standby mode.

The transponder may be deployed on oil-rigs to assist in helicopter navigation to oil rigs. The transponder may be configured to generate an X-band reply at a frequency that is different from the radar signal received by the transponder to allow differentiation between replies from the transponder and radar echo returns. Radar echo returns refer to radar signals transmitted by a radar device that reflect off a building, a tree, or terrain and return to the radar device. The reply from a transponder may be offset from the frequency transmitted by the radar device by, for example, one hundred megahertz or two hundred megahertz. In some examples, the frequency offset may be less than five hundred megahertz different than the transmitted frequency. A reply signal transmitted by a transponder may be coded and some airborne radar systems have the capability of decoding, identifying, and displaying the replies from the transponder.

An oil rig may include one transponder so that a vehicle radar system can determine the location of the oil rig. In contrast, one transponder may be positioned near a runway so that a vehicle radar system can determine the location of the runway, as well as other characteristics of the runway such as the orientation and width of the runway. The vehicle radar system may also be configured to determine the location and orientation of a threshold of the runway.

Existing transponders are typically only compatible with high-power transmitter airborne weather radars that have a minimum power of one thousand Watts. An existing transponder is typically large, heavy, and may require large, expensive batteries for portability. Performance and features required in modern-day airborne weather radar systems require solid-state transmitters (which can be made to be "phase coherent"). Solid-state transmitters may operate at much less than one thousand Watts. Hence, airborne weather radars that offer features such as predictive wind shear detection and volumetric buffer capabilities may not be able to interoperate with high-power transponders.

A system of this disclosure may include an SSC transponder that takes advantage of the high-frequency stability achievable with solid-state transmitters. As a result, the transponder may have a very narrow receiver bandwidth, in turn reducing noise and translating into greater receiver sensitivities. A transponder can be very economical and can have one megahertz of receiver bandwidth to receive one-microsecond length pulses. The transponder may have negative one hundred and twenty-two decibel-milliwatts (dBm) receiver sensitivity, one Watt of transmission power (e.g., for one-microsecond pulses) or possibly even lower by using chirp pulse or pulse compression techniques.

The transponder may, for example, interoperate with a twenty-watt airborne weather radar and still exceed necessary range requirements. With the extremely low transmitter power, the transponder can be small, lightweight, and support extremely long battery life for portability. Weather radar may be made compatible with this type of beacon with only software changes or with software changes and relatively small hardware changes. The transponder may include selectable codes, a search-and-rescue-transponder (SART) sweep frequency capability, and a "corner reflector" mode where the transponder replies at the frequency transmitted by the radar device. SART sweep frequency capability may include 0.4 and 7.5 microsecond sweep cycles through the X-band in response to an X-band interrogation from a radar device.

Various examples are described below generally directed to devices, systems, and methods for low-power compatible X-band radar beacon transponders, or X-band radar beacon transponders that are compatible with vehicle X-band radar systems based on solid-state technology or that otherwise operate at low power, as further described below. Such X-band transponders may be referred to as SSC X-band transponders or SSC transponders, with the understanding that transponders may be more generally compatible with low-power interrogating radar systems such as solid-state aircraft weather radar systems. Transponders may also be based on solid-state radar technology, or may otherwise be configured to detect and respond to low-power interrogating radar transmissions, as further described below. Transponders may include integrated circuits using solid-state transistors rather than or in addition to vacuum tube transistors, particularly for components such as amplifiers, such as driver amplifiers and power amplifiers (including intermediate power amplifiers (IPAs) and/or high-power amplifiers (HPAs)) for radar transmission subsystems, and low-noise amplifiers (LNAs) for radar reception subsystems. For example, SSC X-band transponders may incorporate solid-state power transistors and/or microwave integrated circuits (MICs) as parts of solid-state power amplifiers.

Traditional aircraft X-band radar systems and X-band transponders are based on vacuum-tube technology. A traditional vacuum tube based aircraft X-band radar system may operate at a power of one thousand watts (W) or higher, while a traditional X-band transponder may operate at a power of five hundred watts, in some typical examples. In contrast, a modern solid-state aircraft X-band weather radar system may typically operate at a low power of around twenty to forty watts in some examples, rather than one thousand or more watts as in the traditional vacuum tube based aircraft X-band radar systems. The low power of modern solid-state aircraft X-band weather radar systems, of around twenty to forty watts in various examples, is insufficient power to interoperate with an existing X-band transponder because the existing transponder may have a sensitivity that is negative fifty dBm. Thus, the description above of "low-power" aircraft X-band radar systems may in typical examples refer to aircraft X-band radar systems (e.g., solid-state based aircraft X-band weather radar systems) that operate at on the order of around twenty to forty watts, or otherwise substantially less than one thousand watts, rather than one thousand or more watts. In an illustrative example, a transponder in accordance with this disclosure may incorporate solid-state power amplifiers designed to operate at an average power of around one watt or less.

Modern, low-power, solid-state aircraft X-band weather radar systems offer many advantages over traditional, vacuum tube based, high-power X-band aircraft weather radar systems. Besides the inherent advantage of operating at much lower power, thereby imposing lower power requirements, various implementations of solid-state radar systems may also enable additional advantages such as phase coherence, higher sensitivity, predictive wind shear detection, three-dimensional volumetric radar image buffering, Doppler processing, digital adaptive phased array (DAPA) radar, reduction or elimination of gimbals or other moving parts, reduction in maintenance requirements, and faster scanning of a volume of airspace. However, solid-state airborne radar power levels do not feasibly enable interrogation of traditional X-band transponders, which are typically only sensitive to high power levels typical of vacuum-tube-or magnetron-based radar systems, especially at long ranges. It may not be feasible to design a solid-state radar system to operate at high enough power levels to meet the sensitivity threshold of traditional X-band transponders, especially at long ranges. Traditional X-band transponders also tend to be large and heavy to accommodate their high-power requirements, and tend to require large, expensive batteries for portability. X-band transponders may be configured to operate at high power for long-range omnidirectional service, and may typically operate in a frequency band of around 9.3 to 9.5 GHz.

A transponder of this disclosure may resolve the challenges noted above and include a X-band receiver sensitive enough to detect and respond to X-band radar transmissions of low power typical of solid-state aircraft X-band radar systems. In various examples, a transponder of this disclosure may include a solid-state based X-band receiver and a solid-state based X-band transmitter. The X-band receiver may further include a direct radio-frequency amplifier. The transponder may, in response to receiving an incoming X-band transmission at a first X-band frequency, transmit an outgoing X-band transmission at a second X-band frequency different from the first X-band frequency, which may clearly differentiate the transmission (e.g., a "return X-band radar signal" from the perspective of the weather radar system) from reflections of the aircraft weather-radar transmissions. Features such as these may enable advantageous features over traditional X-band transponders such as high frequency stability, narrow receiver bandwidth, reduced noise, and greater receiver sensitivity, which may be expressed in terms of substantially low minimum discernible signal.

For example, an X-band receiver of a transponder may be configured to receive low-bandwidth interrogation signals typical of a solid-state based aircraft radar. An X-band receiver may be configured to receive transmissions from an airborne radar transmitter operating with a transmission power of less than or equal to forty watts, from within a range of greater than twenty-five nautical miles (nm). In various examples, a transponder with a solid-state based X-band receiver may also be made smaller and lighter and with a substantially lower power requirement than an existing X-band transponder. Example details of transponders may be found in U.S. patent application Ser. No. 15/424,388 filed on Feb. 3, 2017, entitled "Low-Power X Band Transponder," which is incorporated herein by reference in its entirety.

FIG. 1 is a conceptual block diagram of a system 100 for determining a location of a runway 160 based on radar signals 142B-142C, in accordance with some examples of this disclosure. In the example of FIG. 1, system 100 include radar device 110, processing circuitry 120, and memory device 130. System 100 may be configured to mount on a vehicle such as an aircraft (e.g., an airplane, a helicopter, a missile, or a weather balloon) or a space vehicle such as a satellite or spaceship. System 100 may also be configured to mount on a land vehicle such as an automobile or a water vehicle such as a ship or a submarine. System 100 may be configured to mount on a manned vehicle or an unmanned vehicle, such as a drone, a remote-control vehicle, or any suitable vehicle without any pilot or crew on board.

Radar device 110 may include an array of antennas (e.g., a phased array of antennas) that are configured to transmit radar signals 140A and 140B and receive return radar signals 142A-142C. FIGS. 6-9 depicts examples of a phased-array radar device. Radar device 110 may be an electronically steered radar device with an optional mechanical steering element. In some examples, radar device 110 may be configured to transmit radar signals 140A as a single beam and transmit radar signals 140B as a single beam. Processing circuitry 120 may be configured to apply digital beamforming techniques to return radar signals 142A-142C into separate beams to detect weather formation 150 and the positions of transponders 170A and 170B.

Radar device 110 may include solid-state electronic circuitry that operates on relatively low power, as compared to vacuum-tube-based radar devices. For example, radar device 110 may be configured to transmit X-band radar signals 140A and 140B at a power level of less than two hundred watts. In some examples, radar device 110 may be configured to transmit X-band radar signals 140A and 140B at thirty watts, forty watts, eighty watts, one hundred watts, or one hundred and twenty watts. In contrast, a vacuum-tube-based radar device may operate at a power level of one kilowatt or ten kilowatts. In some examples, pulse-compression techniques may increase the effective power level during the transmission of an output pulse by radar device 110. However, the overall power level may remain below two hundred watts because of the shortness of each output pulse (e.g., one microsecond). The overall power level may be equal to the effective power level of the output pulse divided by the pulse compression ratio.

In some examples, radar device 110 includes receiver circuitry with a sensitivity that is greater than negative eighty dBm. As used herein, a sensitivity that is "greater than" negative eighty dBm means that the sensitivity has a higher negative number of dBm. In some examples, the sensitivity of the receiver circuitry of radar device 110 may be negative one hundred and twenty dBm or negative one hundred and twenty-five dBm. The sensitivity of the receiver circuitry may also be referred to as a power level of the "minimum discernable signal."

Processing circuitry 120 may be configured to control radar device 110 by causing radar device 110 to transmit radar signals 140A and 140B. Processing circuitry 120 and radar device 110 may be configured to operate in weather mode 122 and landing mode 124. In weather mode 122, radar device 110 is configured to receive return radar signals 142A. In landing mode 124, radar device 110 is configured to receive return radar signals 142B and 142C.

Radar device 110 and processing circuitry 120 may be configured to operate in landing mode 124 when system 100 is approaching runway 160. Processing circuitry 120 may be configured to initiate landing mode 124 when system 100 is within a threshold distance of runway 160, such as ten nautical miles, five nautical miles, two nautical miles, or one nautical mile. When system 100 is within the threshold distance, system 100 may be configured to interleave modes 122 and 124. At low altitudes, system 100 may be configured to detect wind shear in weather mode 122. Processing circuitry 120 may be configured to control the active mode of radar device 110 based on whether weather mode 122 and/or landing mode 124 is active. In some examples, radar device 110 may be configured to simultaneously receive return radar signals 142A and return radar signals 142B and 142C.

In weather mode 122, radar device 110 may be configured to transmit radar signals 140A to a volume of space outside of system 100. In some examples, radar signals 140A and 140B may be electromagnetic waves in the X band with frequencies of approximately eight Gigahertz to approximately twelve Gigahertz. In some examples, the frequency of radar signals 140A and 140B may be in the range of 9.3 to 9.5 Gigahertz. Radar signals 140A may travel away from radar device 110 and collide with objects such as water molecules and other particles in the volume of space. Radar device 110 may be configured to receive return radar signals 142A. Processing circuitry 120 may also be configured to store data indicating return radar signals 142A in memory device 130. In some examples, return radar signals 142A may indicate weather formation 150, which may include the reflectivity of molecules and/or the presence of wind shear.

In landing mode 124, radar device 110 may be configured to transmit radar signals 140B to a volume of space outside of system 100. Radar signals 140B may travel away from radar device 110 to transponder 170A and optional transponder 170B. Radar device 110 may be configured to receive return radar signals 142B and 142C in landing mode 124. Processing circuitry 120 may be configured to determine the position of transponder 170A based on return radar signal 142B and the position of optional transponder 170B based on return radar signal 142C. In landing mode 124, processing circuitry 120 may be configured to determine the location and orientation of runway 160 based on the positions of transponders 170A and 170B.

Processing circuitry 120 may be configured to determine the relative positions of transponders 170A and 170B based on the time of arrival and phase shift of return radar signals 140B and 140C. Processing circuitry 120 may be configured to determine an absolute position (e.g., latitude, longitude, and altitude) of transponders 170A and 170B based on the location of system 100. Processing circuitry 120 may be configured to determine the location of system 100 based on positioning signals received by a positioning device (e.g., a GNSS device) of system 100. In some examples, processing circuitry 120 may be configured to determine a position of runway 160 relative to system 100 based on the positions of transponders 170A and 170B relative to system 100. Processing circuitry 120 may be further configured to determine the absolute location of runway 160 based on the position of runway 160 relative to system 100.

Processing circuitry 120 may be configured to determine a location of runway 160 based on the positions of transponders 170A and 170B. Processing circuitry 120 may be configured to apply a navigation algorithm to the positions of transponders 170A and 170B and a stored distance between transponders 170A and 170B and the stored position of transponders 170A and 170B relative to the threshold of runway 160. For example, transponders 170A and 170B may positioned two hundred meters apart with the midpoint between transponders 170A and 170B on the centerline of runway 160. In some examples, transponders 170A and 170B may be positioned abeam from (e.g., directly in line with) or a distance (e.g., ten meters) inside or outside of the threshold line of runway 160.

In some examples, processing circuitry 120 may be configured to determine other characteristics of runway 160 based on the positions of transponders 170A and 170B. For example, processing circuitry 120 may be configured to determine the orientation (e.g., the angle) of the centerline of runway 160 or the orientation of the threshold of runway 160 based on the positions of transponders 170A and 170B. Processing circuitry 120 may also be configured to determine an altitude of runway 160 or an altitude of the threshold of runway 160 based on the positions of transponders 170A and 170B. Processing circuitry 120 may be configured to determine the width of runway 160 based on the positions of transponders 170A and 170B (e.g., the distance between transponders 170A and 170B).

Memory device 130 may be configured to store a database of positions of transponders 170A and 170B for one or more runways. The stored positions of transponders 170A and 170B may include distances between transponders 170A and 170B and where transponders 170A and 170B are positioned relative to a point on runway 160 such as threshold line, a corner, a displaced area, or a centerline of runway 160. Memory device 130 may also be configured to store information about the length, width, latitude, longitude, and altitude of runway 160.

In accordance with the techniques of this disclosure, transponders 170A and 170B may be configured to transmit return radar signals 142B and 142C in response to receiving radar signals 140B. The characteristics of radar signals 142B and 142C may allow processing circuitry 120 to distinguish from radar signals 140B that bounce off terrain, buildings, trees, and weather formation 150. Radar device 110 may be able to determine the location of runway 160 even in low- or zero-visibility conditions, independent of GNSS positioning.

Figure 2:
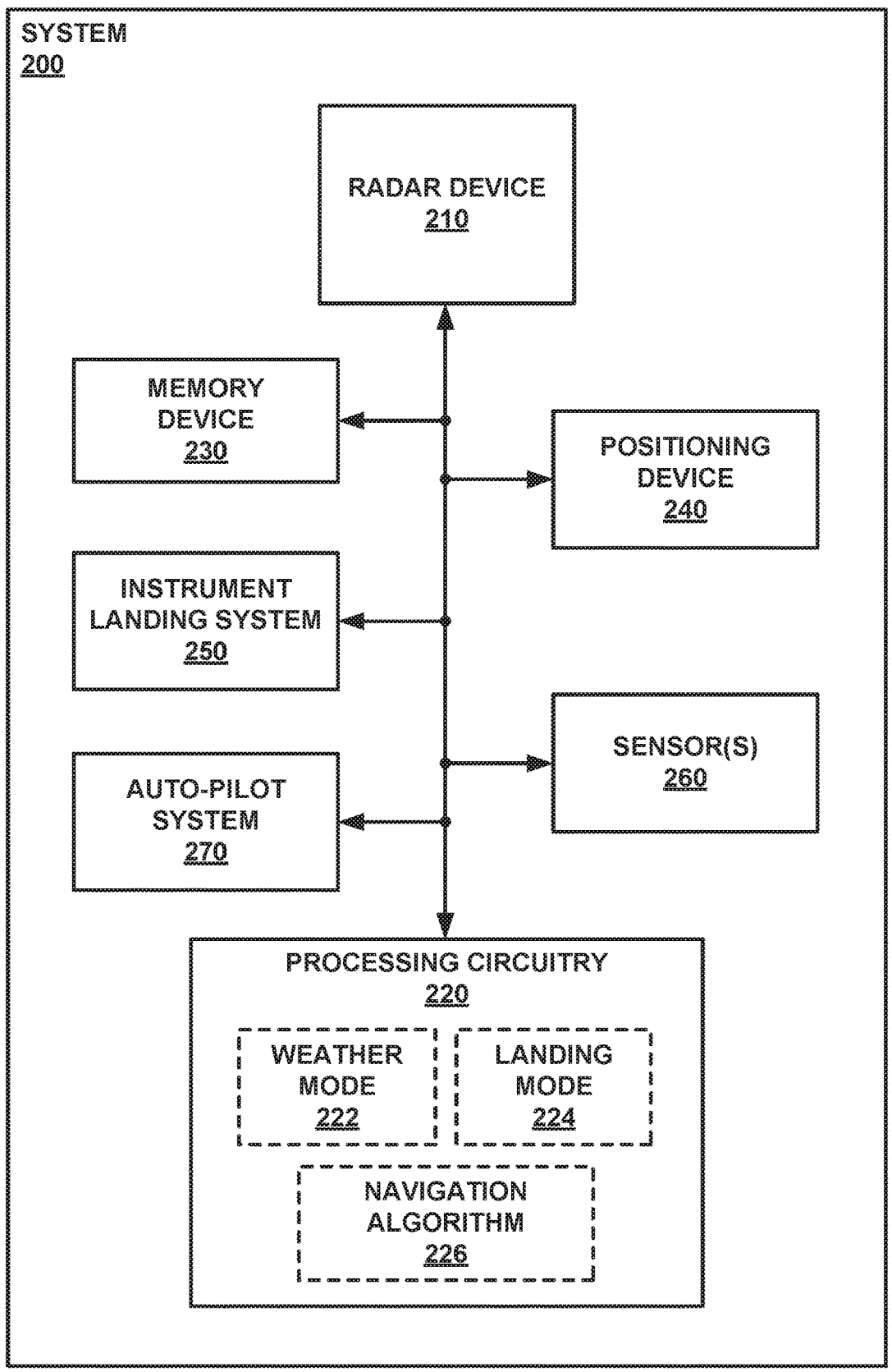
FIG. 2 is a conceptual block diagram of the components of an example system, in accordance with some examples of this disclosure.

FIG. 2 is a conceptual block diagram of the components of an example system 200, in accordance with some examples of this disclosure. In the example of FIG. 2, system 200 includes radar device 210, processing circuitry 220, memory device 230, positioning device 240, instrument landing system (ILS) 250, and sensor(s) 260.

Processing circuitry 220 may be configured to determine the location of a runway by at least applying navigation algorithm 226 to the determined positions of one or more transponders. Navigation algorithm 226 may include a hyperbolic navigation algorithm, a rho-rho navigation algorithm, and/or any other suitable algorithm. For example, processing circuitry 220 may apply a hyperbolic navigation algorithm to the positions of two or more transponders and a known distance between the transponders to determine a location of the runway.

Positioning device 240 may include a GNSS device configured to receive positioning signals from satellites and other transmitters. Positioning device 240 may include satellite navigation equipment such as a GNSS configured to receive positioning signals from multiple satellites or other transmitters in system 200. One example of a GNSS device is a GPS device. Positioning device 240 may be configured to deliver the positioning signals to processing circuitry 220, which may be configured to determine the location of the vehicle on which system 200 is mounted (i.e., the ownship vehicle). In some examples, positioning device 240 may include separate processing circuitry to determine the location of the ownship vehicle, and the separate processing circuitry may be configured to communicate the determined location to processing circuitry 220 for use in determining the positions of weather formations and transponders.

In some examples, memory device 230 may be configured to store a predetermined location of a runway, including latitude, longitude, and/or altitude. Processing circuitry 220 may be configured to determine the location of system 200 based on positioning signals received by positioning device 240. Processing circuitry 220 may then be configured to determine a sensed location of the runway (latitude, longitude, and/or altitude) based on the determined location of at least one transponder, which is based on the return X-band radar signals received by radar device 210. Processing circuitry 220 may be further configured to determine the difference (e.g., distance) between the sensed location and the predetermined location of the runway. If processing circuitry 220 determines that the difference between the sensed and predetermined locations of the runway exceed a threshold distance, processing circuitry 220 may be configured to generate an alert in response to determining that the difference exceeds the threshold distance.

ILS 250 may be configured to assist an operator in landing a vehicle at a runway. ILS 250 may use the determined positions of system 200 and the runway to guide the ownship vehicle to the runway. ILS 250 may be configured to sense lighting devices on the runway and present information to the operator of the ownship vehicle regarding slope, altitude, bearing, and so on. ILS 250 may be configured to present a graphical representation of the runway to the operator of the ownship vehicle.

Sensor(s) 260 may include gyroscopic, solid-state, and/or microelectro-mechanical systems (MEMS) sensors such as gyroscopes, accelerometers, and magnetometers. Sensor(s) 260 may include an attitude and heading reference system (AHRS) with sensors configured to determine roll, pitch, and yaw. Sensor(s) 260 may include solid-state or MEMS gyroscopes, accelerometers, and magnetometers. Sensor(s) 260 may generate signals that indicate the physical orientation of system 200 and the ownship vehicle. In some examples, sensor(s) 260 may include separate processing circuitry to determine the orientation attitude and heading of the ownship vehicle and may be configured to transmit this data to processing circuitry 220. Processing circuitry 220 may be configured to determine the positions of weather formations and transponders based on the attitude and heading data, as well as the signals received by the antennas of radar device 210.

Auto-pilot system 270 may be configured to control the operation and movement of an ownship vehicle on which system 200 is mounted. For example, auto-pilot system 270 may be configured to control propulsors, brakes, engines, and/or motors to cause the ownship vehicle to move, accelerate, decelerate, stop, sand so on. Processing circuitry 220 may be configured to communicate the location and orientation of a runway to auto-pilot system 270 so that auto-pilot system 270 can cause the ownship vehicle to land in low-visibility or zero-visibility conditions based on the determined location of the runway.

Auto-pilot system 270 may be configured to completely or partially control the landing of the ownship vehicle at the runway. In some examples, applicable laws may not allow for auto-pilot system 270 to completely control the landing of the ownship vehicle during a zero-visibility landing, also known as a zero-zero landing. However, the techniques of this disclosure may provide an accurate location of the runway to confirm a location determined by positioning device 240.

Figure 3:
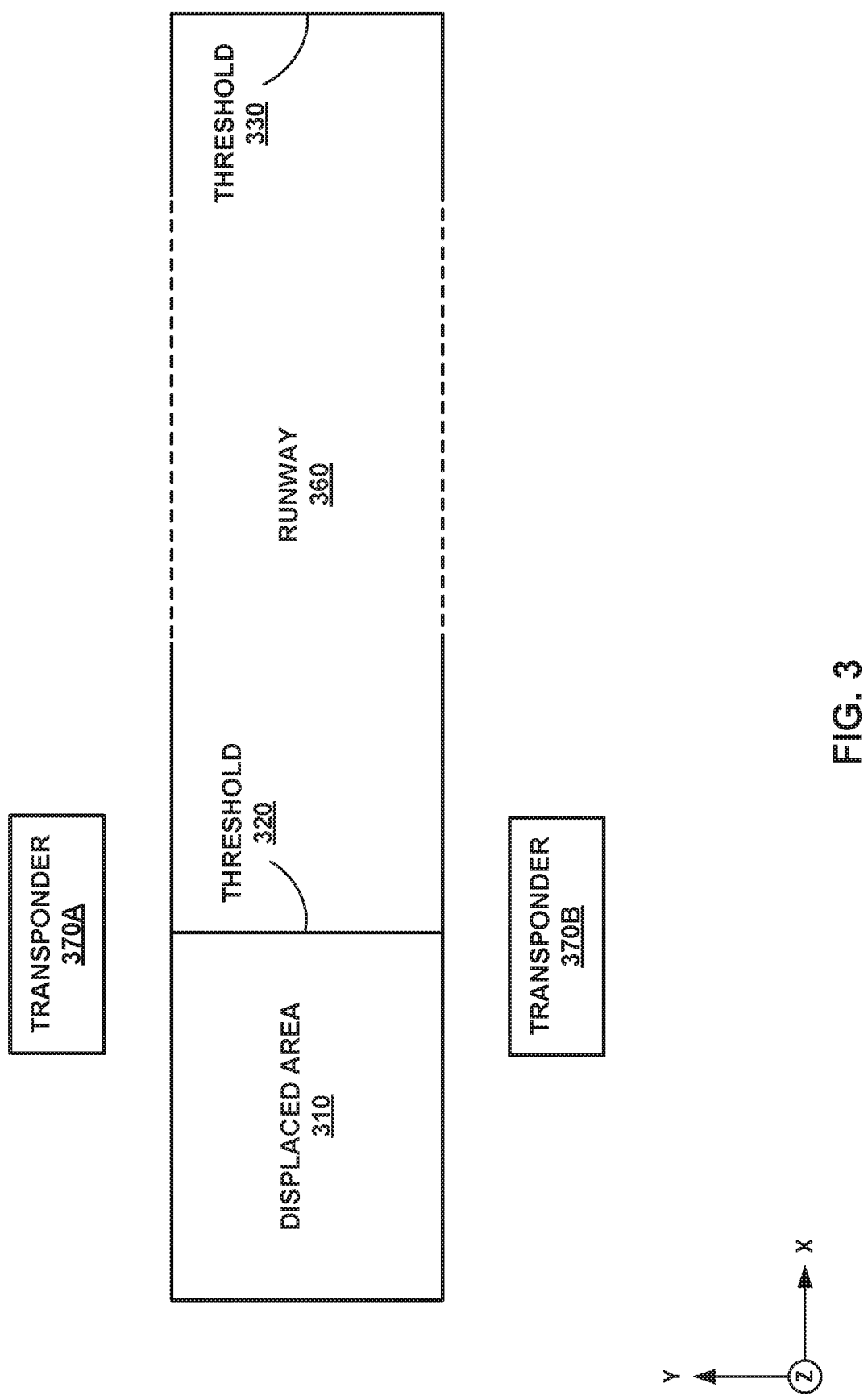
FIG. 3 is a conceptual block diagram of two transponders positioned near a runway, in accordance with some examples of this disclosure.

FIG. 3 is a conceptual block diagram of two transponders 370A and 370B positioned near a runway 360, in accordance with some examples of this disclosure. Runway 360 includes a main area between thresholds 320 and 330 that aircraft may use for landing and takeoff. Runway 360 may also include displaced area 310 outside of the main area. Displaced area 310 may be constructed to handle landing and takeoff, but aircraft may generally avoid using displaced area 310 for landing and takeoff.

In some examples, a length of runway 360 in the x-axis direction that is at least twenty times longer than a width of runway 360 in the y-axis direction. For example, the length of runway 360 may be approximately five thousand feet (approximately fifteen hundred meters), and the width of runway 360 may be approximately three hundred feet (approximately one hundred meters). Processing circuitry may be configured to determine the positions of transponders 370A and 370B at two corners of runway 360. The two corners of runway 360 may be at one end of runway 360 (e.g., the front left corner and the front right corner) near threshold 320, where the other end of runway 360 is near threshold 330.

A memory device may be configured to store known positions of transponders 370A and 370B relative to runway 360 and/or threshold 320. In the example of FIG. 3, transponders 370A and 370B are positioned abeam threshold 320. However, transponders 370A and 370B may be positioned inside of (the positive x-axis direction from threshold 320) or outside of (the negative x-axis direction from threshold 320). Processing circuitry may be configured to determine the location of runway 360 and/or threshold 320 based on the determined positions of transponders 370A and 370B and the known positions of transponders 370A and 370B relative to runway 360 and/or threshold 320. The known positions of transponders 370A and 370B may be relative to a point on runway 360 such as a corner, a centerline, or an end of runway 360. Processing circuitry may also be configured to determine the location and the orientation of runway 360 based on the distance between transponders 370A and 370B that is stored to the memory device.

In some examples, there may be more than two transponders positioned near runway 360. For example, there may be two pairs of transponders positioned near runway 360. A first pair may be positioned near threshold 320, and the second pair may be positioned near threshold 330. In some examples, a first pair of transponders may be positioned near threshold 320, and a second pair of transponders may be positioned twenty meters from the first pair in the negative x-axis direction. The second pair of transponders may indicate the length of displaced area 310 or may provide redundancy in case a transponder in the first pair fails.

Figure 4:
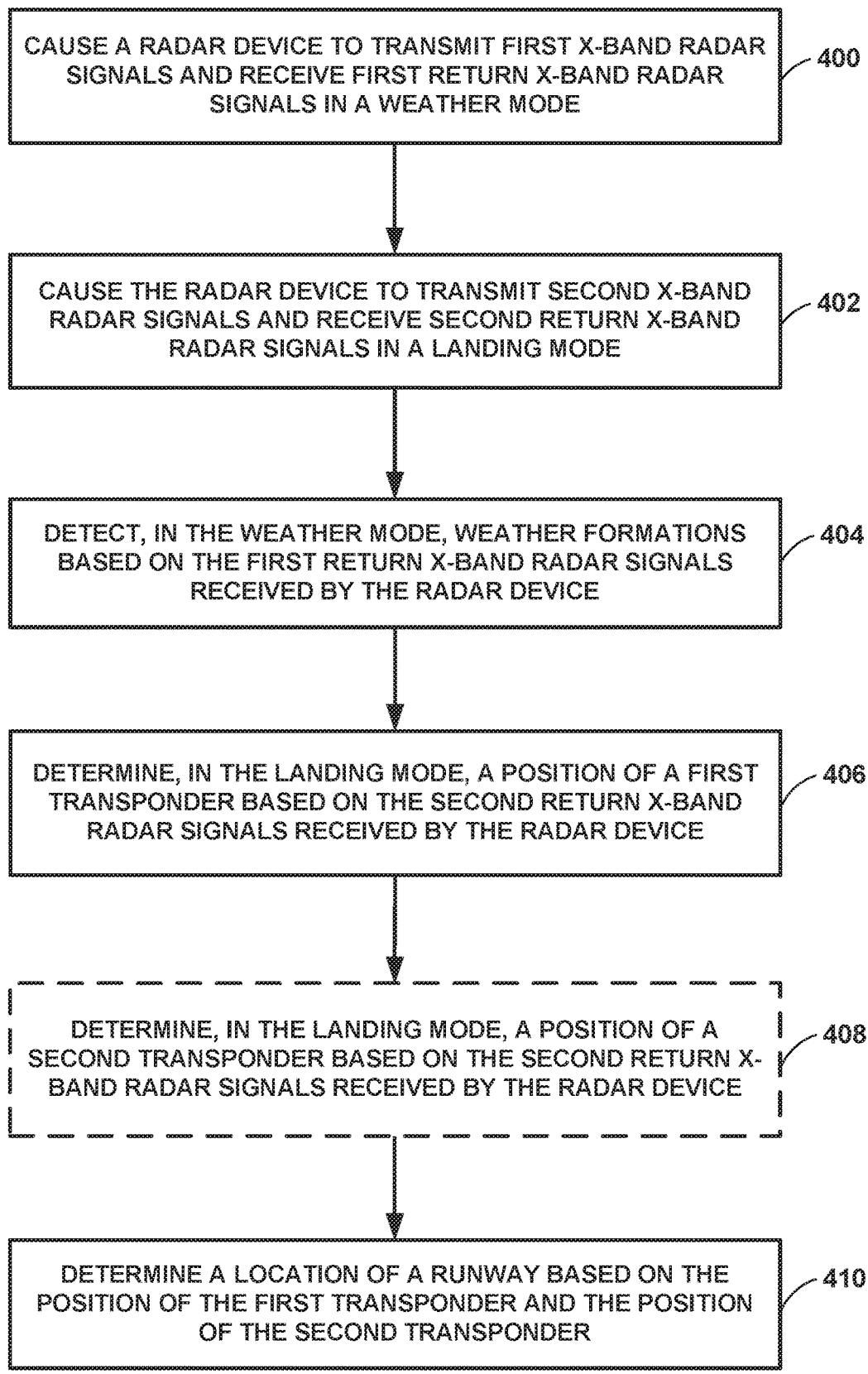
FIG. 4 shows a flowchart for example techniques for determining a location of a runway based on radar signals, in accordance with some examples of this disclosure.
Figure 5A:
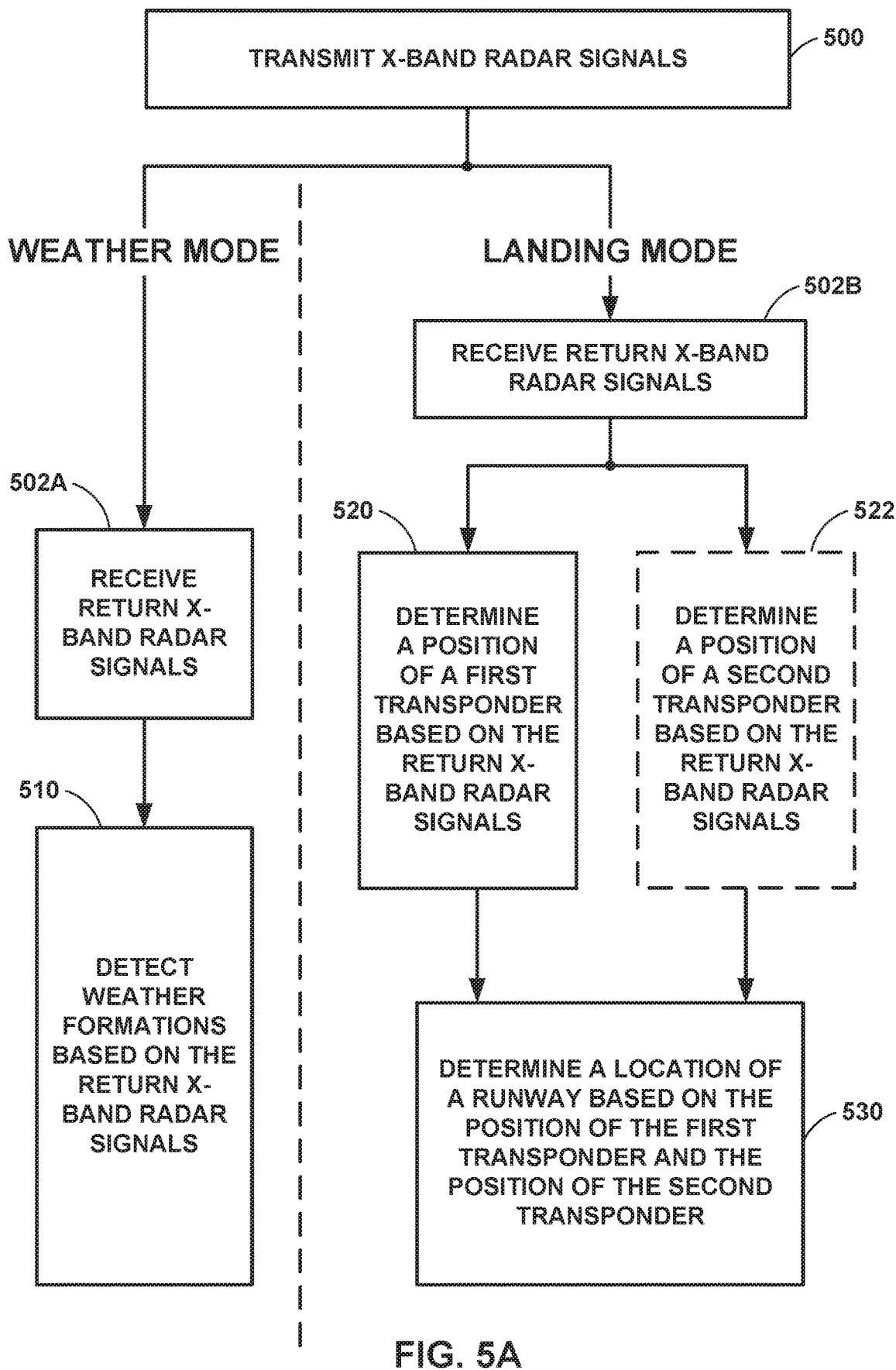
FIGS. 5A and 5B show flowcharts for example techniques for determining a location of a runway in a landing mode, in accordance with some examples of this disclosure.
Figure 5B:
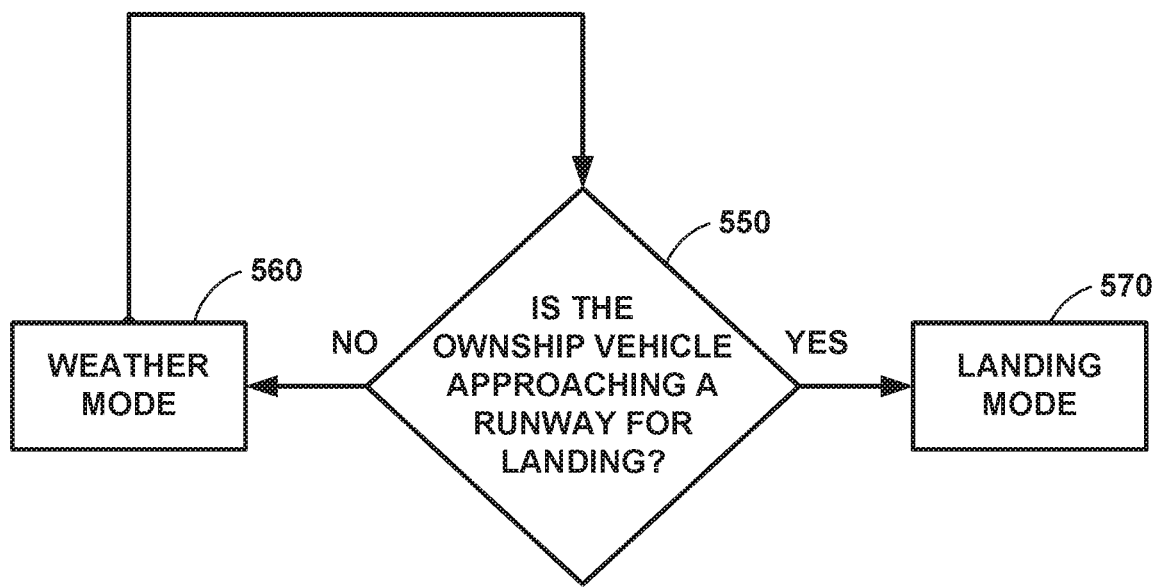

FIG. 4 shows a flowchart for example techniques for determining a location of a runway based on radar signals, in accordance with some examples of this disclosure. The techniques of FIGS. 4, 5A, and 5B are described with reference to system 100 of FIG. 1, including processing circuitry 120, although other components such as system 200 of FIG. 2, may perform similar techniques.

In the example of FIG. 4, processing circuitry 120 causes radar device 110 to transmit X-band radar signals 140A and receive return X-band radar signals 142A in weather mode 122 (400). In the example of FIG. 4, processing circuitry 120 causes radar device 110 to transmit X-band radar signals 140B and receive return X-band radar signals 142B and 142C in landing mode 124 (402).

In the example of FIG. 4, processing circuitry 120 detects, in weather mode 122, weather formation 150 based on return X-band radar signals 142A received by radar device 110 (404). Weather formation 150 may include water particles, water vapor, water droplets, clouds, precipitation, ice crystals, wind shear, turbulence, and so on. System 100 may be configured to operate in weather mode 122 when the ownship vehicle is not within a threshold distance of runway 160. Processing circuitry 120 may be configured to cause radar device 110 to transmit X-band radar signals 140A and 140B at a first frequency in both weather mode 142 and landing mode 144.

In the example of FIG. 4, processing circuitry 120 determines, in landing mode 124, the positions of transponders 170A and 170B based on return X-band radar signals 142B and 142C received by radar device 110 (406 and 408). Transponders 170A and 170B may be configured to receive X-band radar signals 140B and 140C at a first frequency and transmit return X-band radar signals 142B and 142C at a second frequency that is offset from the first frequency. Processing circuitry 120 may be configured to cause radar device 110 to transmit X-band radar signals 140A and 140B at the first frequency.

In landing mode 124, processing circuitry 120 may be configured to filter out return X-band radar signals at the first frequency and identify, discriminate, lock on to, pass through, or search for return X-band radar signals 142B and 142C at the second frequency. Processing circuitry 120 may include filter circuitry, such as a band-pass filter, configured to remove signals at the first frequency from return X-band radar signals 142B and 142C in order to identify the response from transponders 170A and 170B. In some examples, processing circuitry 120 may be configured to execute software instructions to filter return X-band radar signals 142A-142C to identify signals at the first frequency in weather mode 122 and to identify signals at the first frequency in landing mode 124. Processing circuitry 120 may be configured to tune the receiver circuitry of radar device 110 to the first frequency (i.e., the frequency of radar signals 140A) in weather mode 122. Processing circuitry 120 may be configured to tune the receiver circuitry of radar device 110 to the second frequency (i.e., the offset frequency) in landing mode 124.

The difference between the first and second frequencies may be referred to as an "offset." Transponders 170A and 170B may be configured to reply at an offset frequency so that radar device 110 and processing circuitry 120 can filter out reflections of radar signals 140A and 140B off terrain, buildings, trees, and objects in landing mode 124. In the example of FIG. 4, processing circuitry 120 determines a location of runway 160 based on the position of transponder 170A and the position of transponder 170B (410). Processing circuitry 120 may apply a navigation algorithm to the positions of transponders 170A and 170B.

Processing circuitry 120 may be configured to output the location of runway 160 by, for example, displaying the location on a map that is presented to an operator of the ownship vehicle. Processing circuitry 120 may also be configured to display a distance from the ownship vehicle to a threshold of runway 160. Processing circuitry may be configured to generate an alert based on the location of runway 160 such as if the altitude of the ownship vehicle is outside an acceptable range for an approach to runway 160 (e.g., a landing maneuver).

FIGS. 5A and 5B show flowcharts for example techniques for determining a location of a runway in a landing mode, in accordance with some examples of this disclosure. In some examples, processing circuitry 120 may be configured to determine between weather mode 122 and landing mode 124 at any stage of the process depicted in FIG. 5A.

In the example of FIG. 5A, processing circuitry 120 causes radar device 110 to transmit X-band radar signals 140A in weather mode 122 and X-band radar signals 140B in landing mode 124 (500). Processing circuitry 120 also causes radar device 110 to receive return X-band radar signals 142A in weather mode 122 and return X-band radar signals 142B and 142C in landing mode 124 (502A and 502B). Processing circuitry 120 may be configured to identify return X-band radar signals 142A at the frequency of X-band radar signals 140A and identify return X-band radar signals 142B and 142C at a frequency that is offset from the frequency of X-band radar signals 140A. In some examples, processing circuitry 120 may be configured to transmit X-band radar signals 140B in landing mode 124 at a different frequency than X-band radar signals 140A in order to avoid over-interrogating transponders 170A and 170B.

In weather mode 122, processing circuitry 120 detects weather formation 150 based on return X-band radar signals 142A (510). In landing mode 124, processing circuitry 120 determines the positions of transponders 170A and 170B based on return X-band radar signals 142B and 142C (520 and 522). For example, processing circuitry 120 may determine the positions of transponders 170A and 170B based on the time and angle (e.g., phase shift) of arrival of return X-band radar signals 142B and 142C. In landing mode 124, processing circuitry 120 determines the location of runway 160 based on the positions of transponder 170A and 170B (530). Processing circuitry 120 may be configured to determine the location of runway 160 by applying a navigation algorithm to the positions of transponder 170A and 170B.

In the example of FIG. 5B, processing circuitry 120 determines whether the ownship vehicle is approaching runway 160 for landing (550). Processing circuitry 120 may determine that the ownship vehicle is approaching runway 160 for landing based on input data from an operator of the ownship vehicle, an altimeter, the orientation of the ownship vehicle, the location of the ownship vehicle, and/or a flight plan for the ownship vehicle. Processing circuitry 120 may make the determination based on the distance between the ownship vehicle and runway 160. If processing circuitry 120 determines that the ownship vehicle is not approaching runway 160 for landing, the processing circuitry 120 operates in weather mode 122 in the example of FIG. 5B (560).

In contrast, if processing circuitry 120 determines that the ownship vehicle is approaching runway 160 for landing, the processing circuitry 120 operates in landing mode 124 in the example of FIG. 5B (570). Processing circuitry 120 may be configured to interleave modes 122 and 124 when the ownship vehicle is approaching runway 160. By interleaving modes 122 and 124, system 100 may be able to continue to determine weather conditions when the ownship vehicle is landing, rather operating exclusively in landing mode 124.

FIGS. 6-9 depict example hardware configurations for radar device 110. In some examples, radar device 110 may be configured to operate in FMCW and/or pulsed mode. Additionally or alternatively, radar device 110 may also include other hardware configurations. Example details of radar devices may be found in U.S. patent application Ser. No. 14/488,129 filed on Sep. 16, 2014, entitled "Digital Active Array Radar" and U.S. patent application Ser. No. 14/488,154 filed on Sep. 16, 2014, entitled "Digital Active Array Radar," which are incorporated herein by reference in their entirety.

Figure 6:
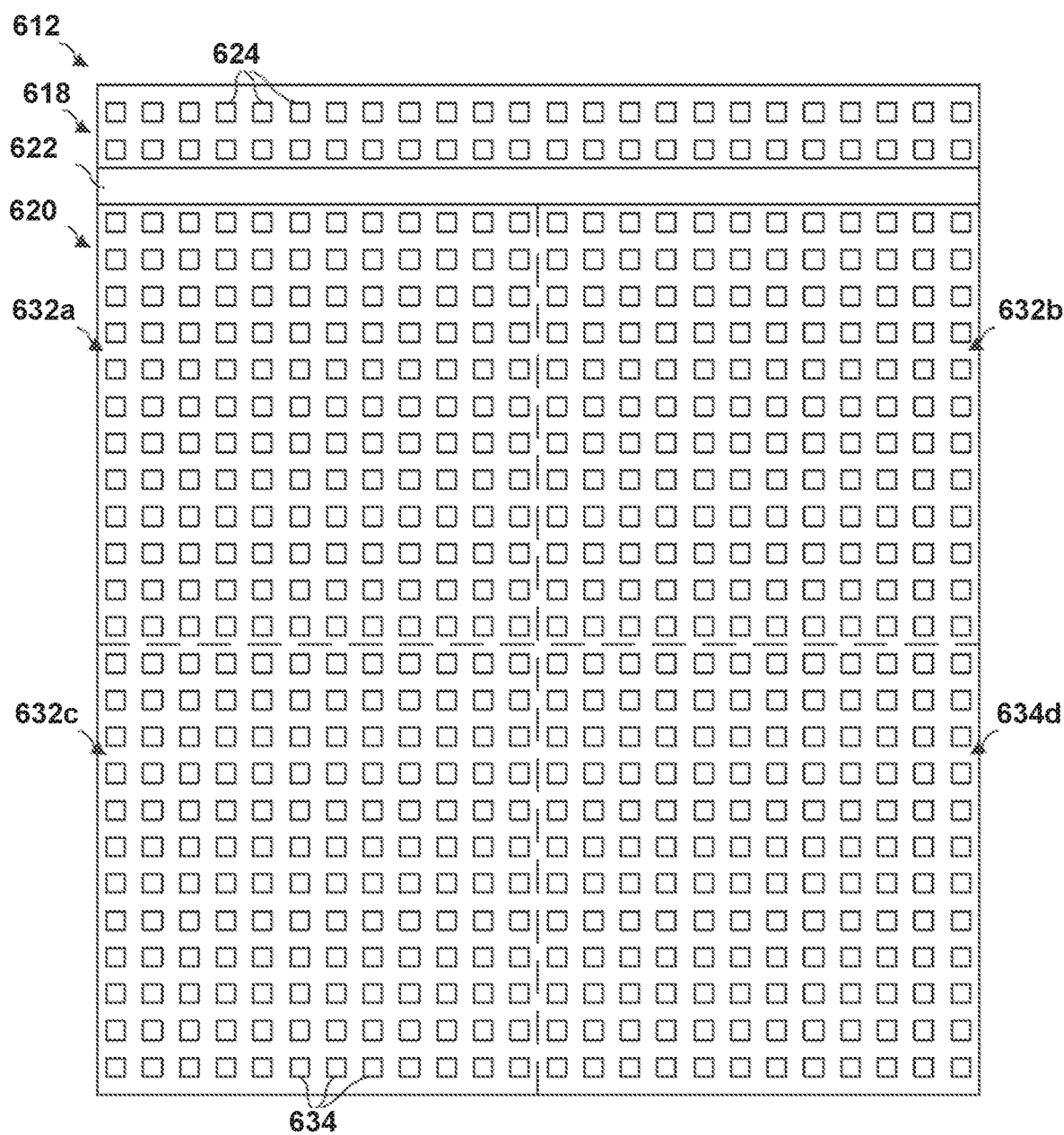
FIG. 6 is a conceptual diagram illustrating an example FMCW radar array.

FIG. 6 is a conceptual diagram illustrating an example FMCW radar array 612. FMCW radar array 612 includes a transmit array 618 and a receive array 620. The example of FMCW radar array 612 shown in FIG. 6 also includes electronic bandgap (EBG) isolator 22 disposed between the transmit antenna and the receive antenna. Transmit array 618 and receive array 620 are physically proximate to each other, e.g., located in a single housing such as housing 713 shown in FIGS. 7A and 7B.

Transmit array 618 includes a plurality of transmit antenna elements 624. In some examples, transmit array 618 includes two rows (oriented horizontally in the example of FIG. 6) of transmit antenna elements 624, and each row includes twenty-four transmit antenna elements 624. In general, transmit array 618 may include at least one row of transmit antenna elements 624, and each row may include a plurality of antenna elements 624. In some examples, adjacent transmit antenna elements 624 may be spaced apart in the horizontal direction by approximately one-half of the wavelength of the transmit beam generated using transmit array 618.

As shown in FIG. 6, receive array 620 may be conceptually divided into quadrants 632a, 632b. 632c. 632d (collectively. "quadrants 632"). In some examples, receive array 620 is also electrically divided into quadrants 632, e.g., based on the electrical connections of the receive antenna elements 634 to receive electronics that process the signals detected by receive antenna elements 634. Receive signals from each of receive antenna elements 634 may be used to generate monopulse tracking beams using monopulse beam arithmetic, and dividing receive array 620 into quadrants 632 may facilitate generation of monopulse tracking beams, as described below. In some examples, each of quadrants 632 includes the same number of receive antenna elements 634. For example, in the implementation shown in FIG. 6, each of quadrants 632 includes twelve rows of twelve receive antenna elements 634, for a total of one hundred and forty-four receive antenna elements 634 in each of quadrants 632 (each row is oriented horizontally and each column is oriented vertically in the example of FIG. 6). In other examples, each of quadrants 632 may include twelve rows of receive antenna elements 634, each row including twelve receive antenna elements 634 (for a total of one hundred and forty-four receive antenna elements in each of quadrants 632). Hence, in the illustrated example, receive array 620 includes twenty-four rows of receive antenna elements 634, and each row includes twenty-four receive antenna elements 634.

In other examples, receive array 620 may include a different number of receive antenna elements 634. For example, receive array 620 may include more or fewer rows of receive antenna elements 634, and each row may include more or fewer receive antenna elements 634 than depicted in FIG. 6. In general, receive array 620 may include a plurality of rows of receive antenna elements 634 and each row may include a plurality of receive antenna elements 634. In some examples, adjacent receive antenna elements 634 may be spaced apart in the horizontal direction by approximately one-half of the wavelength of the transmit beam generated using transmit array 618.

In some examples, receive antenna elements 634 may be arranged in a square array of receive antenna elements 634 (e.g., the number of rows of receive antenna elements 634 is the same as the number of receive antenna elements 634 in each row). In other examples, receive antenna elements 634 may be arranged in a rectangular arrant of receive antenna elements 634 (e.g., the number of rows of receive antenna elements 634 is different than the number of receive antenna elements 634 in each row). Additionally or alternatively, in some examples, the number of receive antenna elements 634 in a row of receive array 620 may be different than the number of transmit antenna elements 624 in a row of transmit array 618. Alternatively, or additionally, receive antenna elements 634 may not be arranged in rows and columns as depicted in FIG. 6; instead, receive antenna elements 634 may be arranged in another geometric or non-geometric array.

Figure 7A:
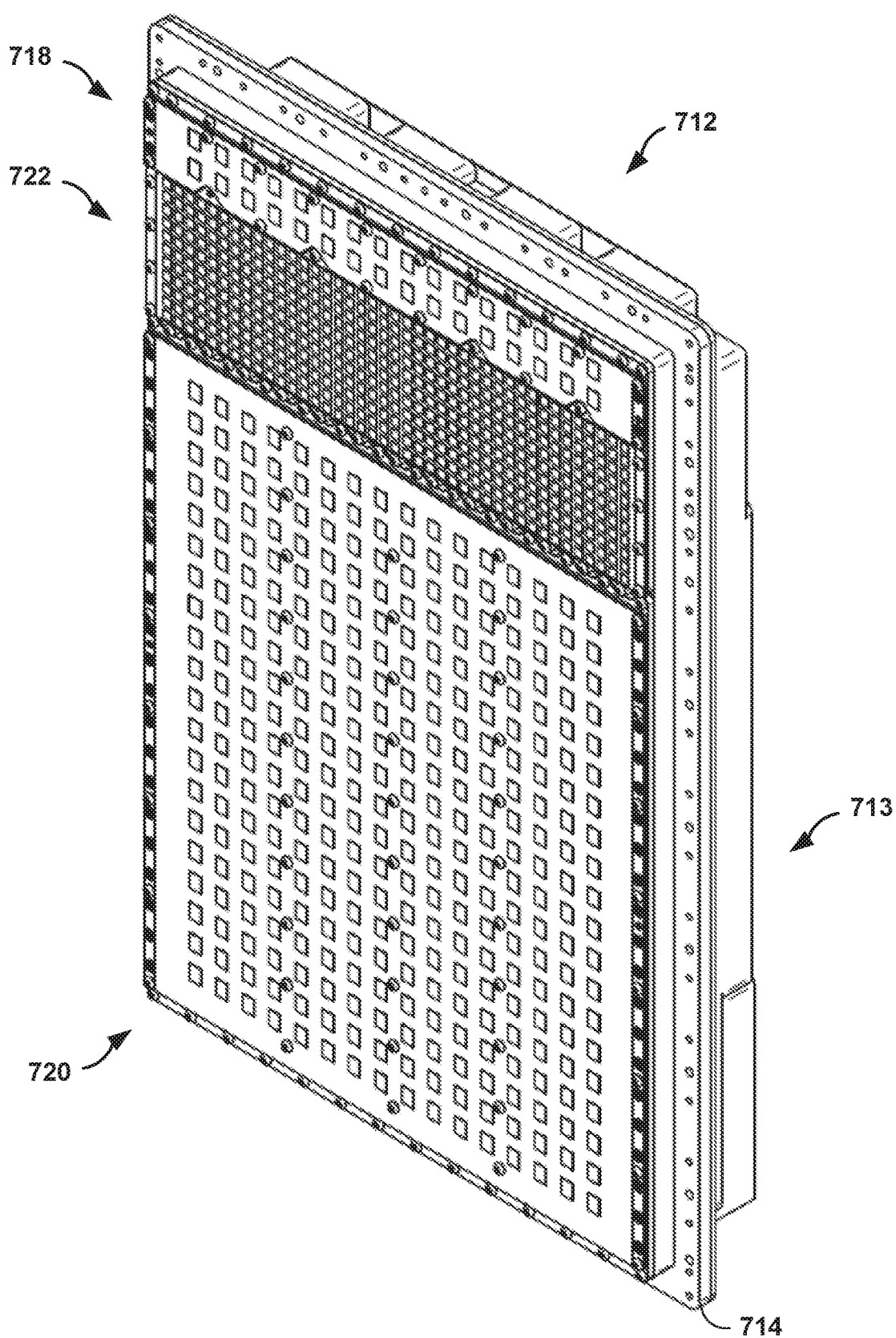
FIGS. 7A and 7B are front- and back-view diagrams of an example FMCW radar device.
Figure 7B:
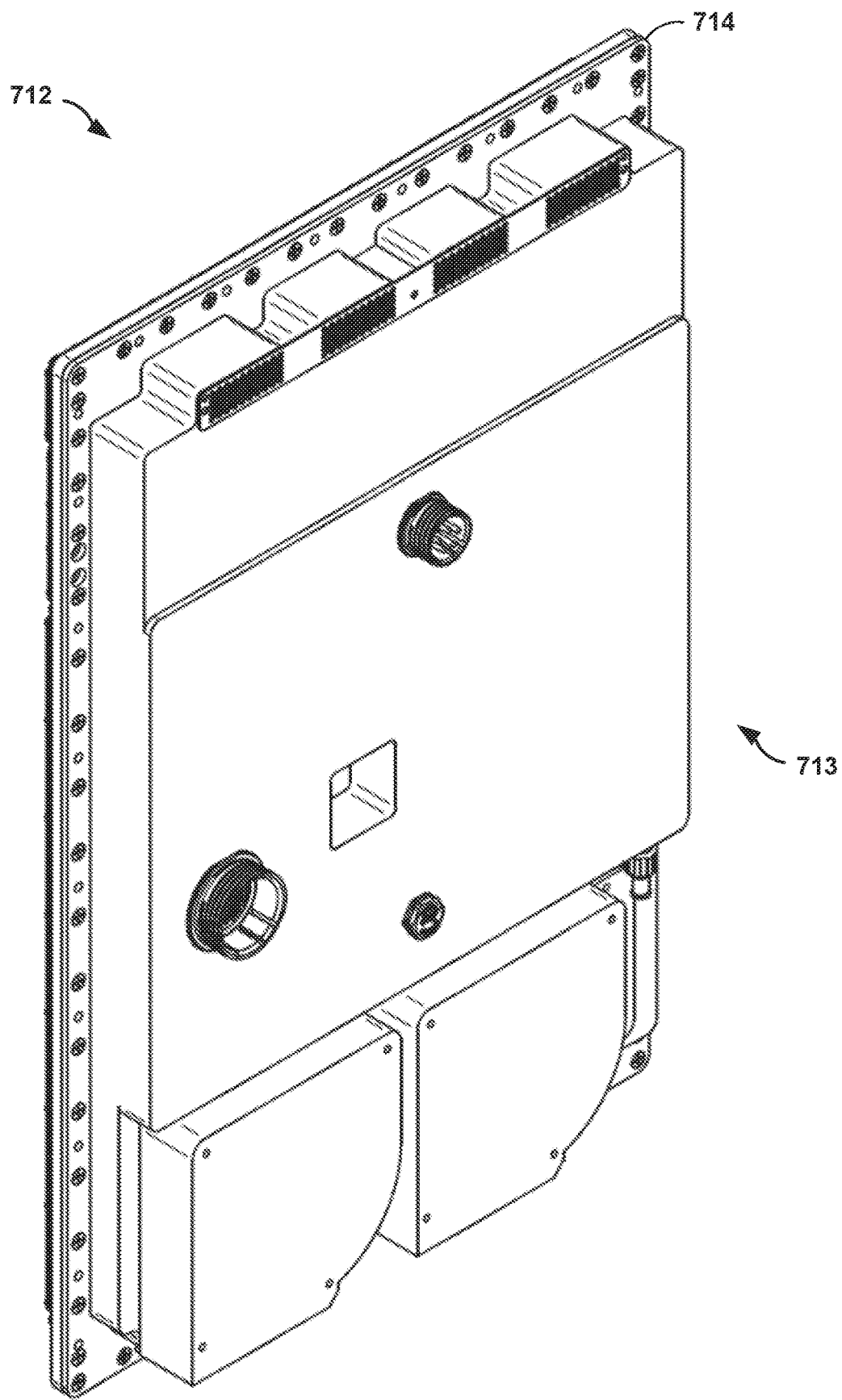

FIGS. 7A and 7B are front- and back-view diagrams of an example FMCW radar device. In some examples, radar panel 711 may include a plurality of printed circuit boards disposed substantially parallel to each other and to the front surface of radar panel 711. In some examples, the top layer printed board may be referred to as a patch layer, and may include antenna elements, such as transmit array 718, EBG isolator 722 and receive array 720 and radio frequency components. Transmit array 718, receive array 720 and EBG isolator 722 may be similar or the same as integrated radar device 811 depicted in FIGS. 8A and 8B. In the example of FIGS. 7A and 7B, EBG isolator 722 is disposed between the transmit antenna array 718 and the receive antenna array 720. In some examples, EBG isolator 722 may be a printed array of resonant patch elements having dimensions selected to provide cancellation of electromagnetic radiation from the frequency modulated continuous wave transmit beam to reduce a magnitude of radiation from transmit array 718 to which receive array 720 is indirectly exposed. In other words, EBG isolator 722 may isolate transmit array 718 from receive array 720. The components of radar panel 711 may be a single, integrated package.

In some examples, other printed boards (not shown in FIGS. 7A and 7B) may include digital and frequency synthesizer components, including devices, such as field programmable gate arrays (FPGAs) that control scanning and beamforming on receive. Some additional printed circuit boards may include power supply components and additional signal processing components, along with an interface for connecting radar panel 711 to other FMCW radar arrays and/or components of the aircraft or device on which radar panel 711 is utilized. In some examples, multiple FMCW radar arrays may be connected to common control electronics, which may control operation of the FMCW radar arrays, including, for example, radar pulse synchronization, scanning frequencies, target tracking, or the like.

The printed circuit boards, transmit array 718 and receive array 720 are physically proximate to each other, e.g., located in a single housing 713. For example, the patch layer, heatsink 714 and the cover may be considered a housing, similar or the same as housing. The printed circuit boards, including the patch layer may include components, such as processing circuitry 120 and memory device 130 in relation to FIG. 1, for an FMCW radar device and located in single housing.

In some examples, a proposed system may be a continuous wave radar device that transmits one hundred percent of the time at a power level of approximately thirty watts. The radar device may be configured to use a total input power of approximately five hundred and fifty watts for three faces. The top transmit element rows use transmitter parts, while the remaining receive element rows use receive only parts. This configuration may reduce costs by reducing the number of high-cost transmit components.

Figure 8A:
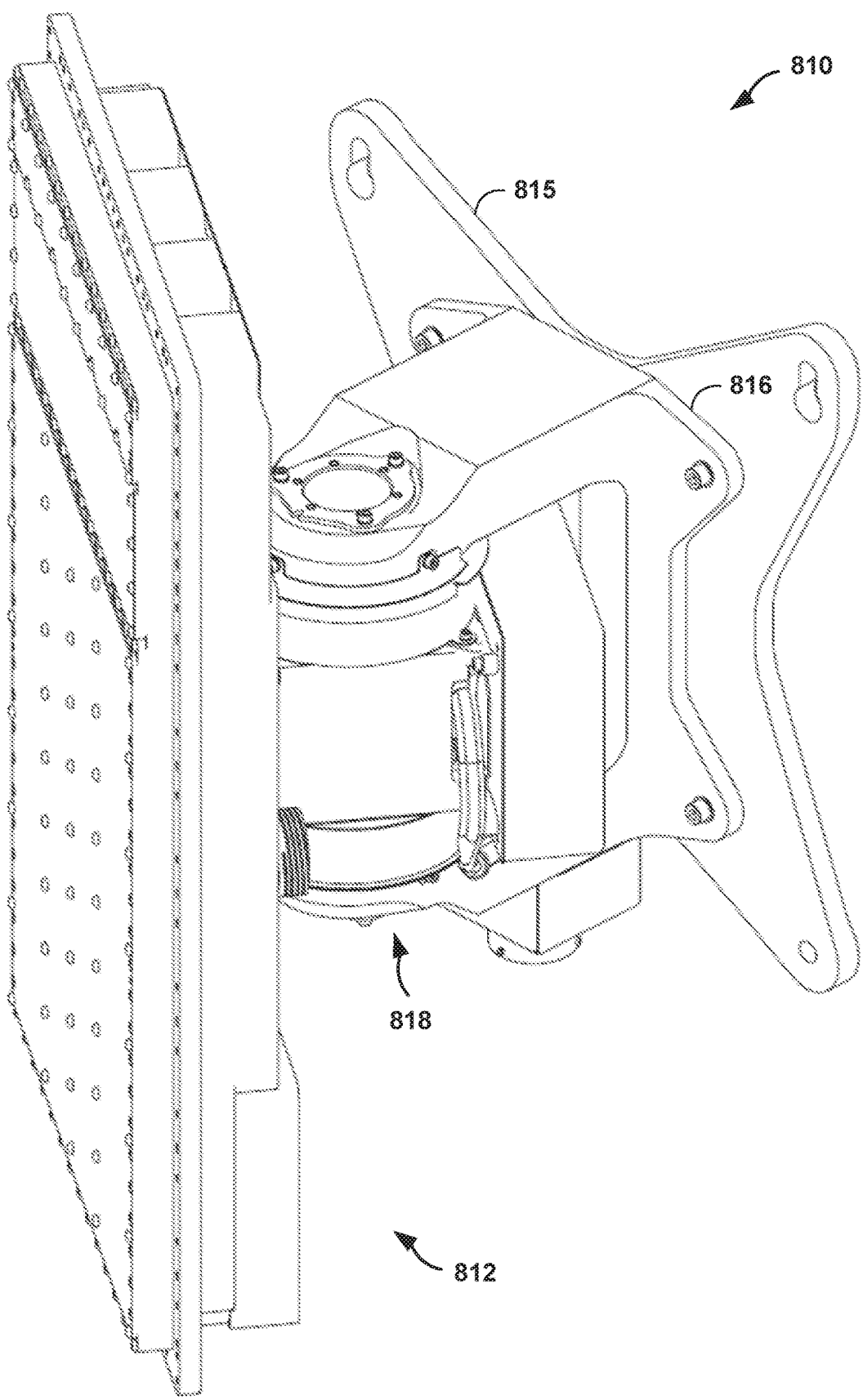
FIGS. 8A and 8B are front- and back-view diagrams of an example FMCW radar device.
Figure 8B:
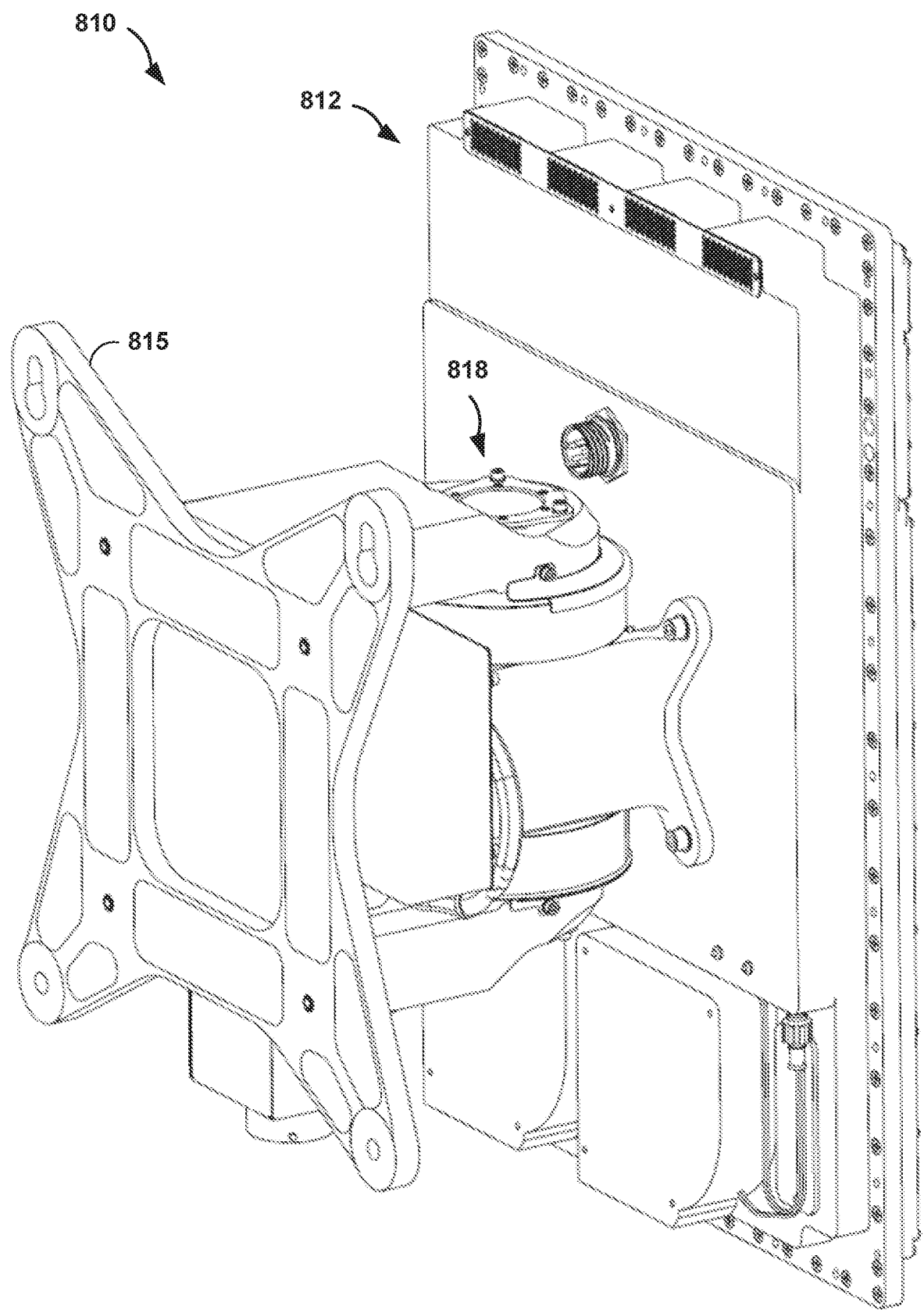

FIGS. 8A and 8B are isometric-view diagrams of an example FMCW radar device. Radar apparatus 810 includes integrated radar device 811 (e.g., a radar panel) supported by gimbaled mount 815. Though radar apparatus 810 may be used in a variety of applications, this disclosure will focus on the application as a weather radar in an aircraft, to simplify and clarify the description.

Integrated radar device 811 of radar apparatus 810 outputs an FMCW transmit beam and may electronically scan the FMCW transmit beam in azimuth, e.g. the horizontal direction with respect to the ground. Integrated radar device 810 may receive a plurality of receive signals reflected from objects or weather within the field of regard (FOR) of integrated radar device 810. Integrated radar device 810 may digitally generate, using the plurality of receive signals, a plurality of receive beams within the area illuminated by the FMCW transmit beam.

Gimbaled mount 815 may mechanically scan integrated radar device 810 in azimuth, which extends the angular range of coverage for the electronic scan of integrated radar device 810. In some examples, gimbaled mount 815 may receive a position signal and rotate and aim integrated radar device 810 in response to the position signal. In other words, gimbaled mount 815 is configured to mechanically move the integrated radar device to various positions in the second illumination direction. In this manner, radar apparatus 810 may cover a larger FOR than a single integrated radar device could cover by electronic scanning alone.

FIG. 8B depicts radar apparatus 810, which includes integrated radar device 811 supported by gimbaled mount 815, which perform the same functions as described above. FIG. 8B further depicts mounting portion 816 and rotatable housing 818 of gimbaled mount 815. Mounting portion 816 is one example of a mounting portion of a gimbaled mount 815 that may attach radar apparatus 810 to, for example, within the nose radome of an aircraft or a UAV. Mounting portion 816 may be configured to support radar apparatus 810 during operations where radar apparatus 810 may encounter vibration, acceleration forces, turning forces and similar stresses.

Housing 818 may rotate in relation to mounting portion 816, for example, in response to a position signal that causes gimbaled mount 815 to mechanically rotate integrated radar device 811 to one or more angular positions. Housing 818 may include one or more motors (not shown in FIGS. 8A and 8B) that are configured to rotate integrated radar device 810. The one or more motors may be controlled by electronic circuitry within integrated radar device 810. In other examples, the one or more motors may receive control signals from other circuitry, such as circuitry within a radar display and control unit (not shown in FIGS. 8A and 8B). A radar display and control unit may be mounted in a vehicle, such as the cockpit of an aircraft, and display objects and weather detected by radar apparatus 810.

Housing 818 may also include a coiled cable, the coiled cable comprising a plurality of conductors (not shown in FIGS. 8A and 8B). In some examples, the coiled cable may be configured to electrically connect the integrated radar device to the mounting portion and further to the radar display and control unit. The coiled cable may carry electrical power and signals to and from integrated radar device 811. For example, the coiled cable may carry control signals from the radar display and control unit to change the electronic scan pattern of the FMCW transmit beam. The coiled cables may carry signals to the one or more motors to cause gimbaled mount 815 to rotate integrated radar device 810 in the second illumination direction.

The coiled cable may, in some examples, be referred to as a clock spring cable, because the coiled cable may have a shape similar to a clock spring. Other examples may include a multi-pass box spring cable and a single pass flat ribbon cable. In some examples, housing 818 may include multiple, redundant coiled cables to improve reliability. Housing 818, the motors described above, or other components of radar apparatus 810 may provide position feedback to determine the angular position of integrated radar device 811.

In operation, integrated radar device 811 may be configured to electronically scan the FMCW transmit beam in the second illumination direction when gimbaled mount 815 is mechanically stationary at a predetermined position of a plurality of predetermined positions. In other examples, radar apparatus 810 may be configured to simultaneously mechanically scan/rotate integrated radar device 811 with gimbaled mount 815 while integrated radar device 811 electronically scans the radar transmit beam. Electronically scanning the transmit beam while stationary at a predetermined position may have advantages in simplifying the operation of radar apparatus 810. For example, signal processing circuitry within integrated radar device 811 may be less complex if configured to interpret to angular position of a target from a fixed mechanical position of integrated radar device 811. The signal processing circuitry may also be configured to determine a more precise target location from a fixed mechanical position, when compared to considering both a moving electronic transmit beam and a moving integrated radar device 810.

Radar apparatus 810 of this disclosure may have advantages over other configurations of radar systems that perform similar functions. In addition to the advantages described above, a gimbaled mount that rotates only in the second illumination direction simplifies operation when compared to radar systems that mechanically aim a pencil beam type radar transmit beam in multiple directions. The pencil beam type radar systems may require multiple, high-torque motors to rapidly slew the pencil beam to cover the entire radar FOR, such as in a complex raster pattern. In contrast, radar apparatus 810 of this disclosure may be configured to use less complex, lower torque motors, such as a brushless DC motor, which may reduce cost of radar apparatus 810 compared to mechanically scanned pencil beam radar systems. The reduced demand on motors in radar apparatus 810 may also improve reliability and mean time between failures (MTBF) when compared to other types of radar systems. Additionally a single integrated radar device, fewer motors, and a less complex mechanical support system may have the advantage of reduced power consumption, reduced cost, reduce mass and less weight when compared to other existing radar systems.

Figure 9:
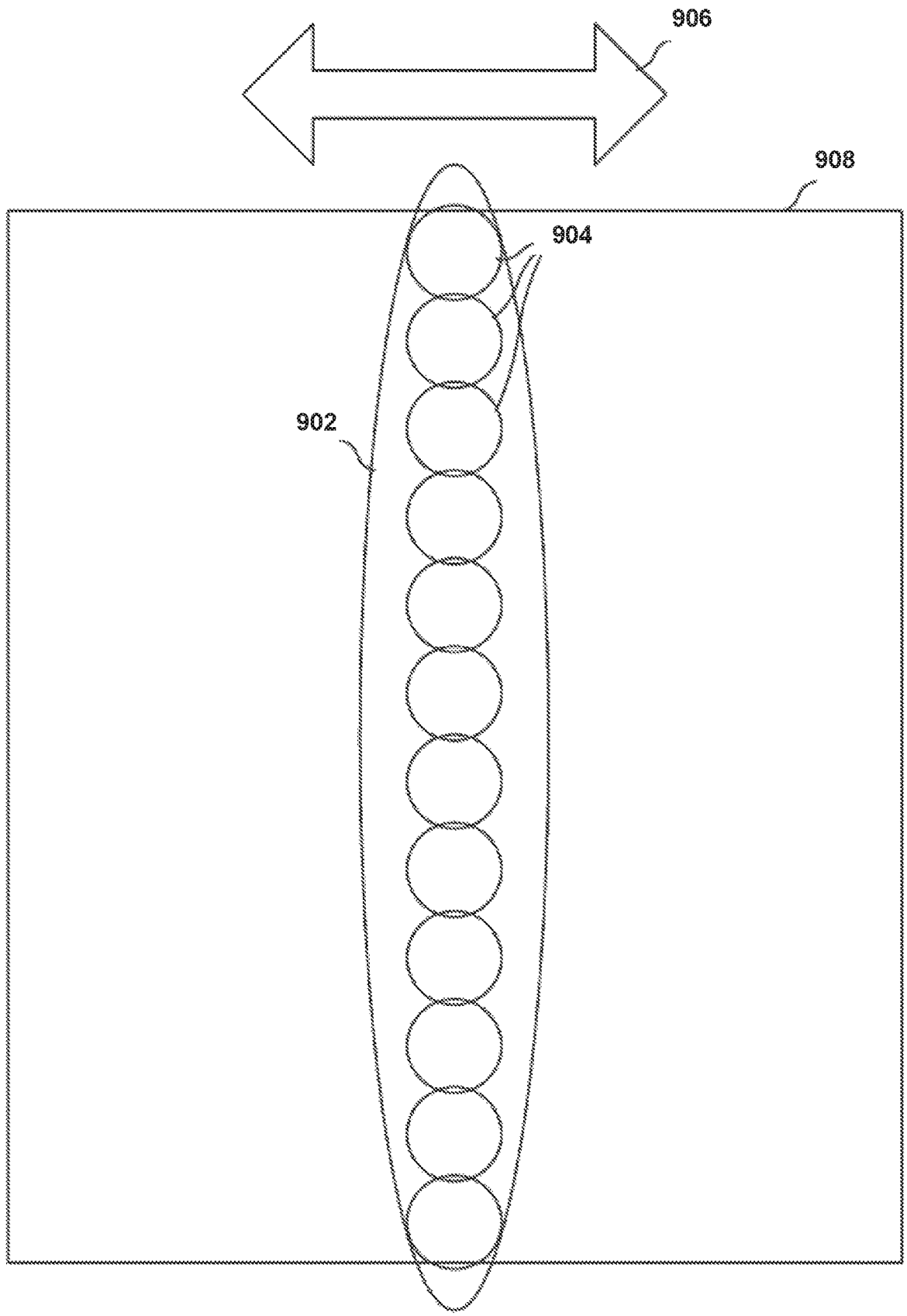
FIG. 9 is a conceptual diagram illustrating an example transmit beam and a plurality of example receive beams.

FIG. 9 is a conceptual diagram illustrating an example transmit beam 902 and a plurality of example receive beams 904, which may be generated using transmit array 618 and receive array 620. Transmit beam 902 is depicted as being approximately elliptical in shape, with a greater extent in elevation than in azimuth. FIG. 9 also depicts a representation of a predetermined area 908 which is to be illuminated by FMCW array 612 (FIGS. 6, 7A, 7B). As shown in FIG. 9, transmit beam 902 may be at least as tall in elevation as the elevation of predetermined area 908, such that transmit beam 902 illuminates the entire elevation of a section of predetermined area 908 without steering or scanning transmit beam 902 in elevation. In other examples, as described above, transmit beam 902 may be wide in azimuth and short in elevation. In general, transmit beam 902 may have a greater extent in a first illumination direction than in a second illumination dimension substantially perpendicular to the first illumination dimension.

A transmit electronics module associated with transmit array 618 may be configured to scan, or steer, transmit beam 902 in azimuth (e.g., the second illumination dimension), as indicated by arrow 906. In some examples, the transmit electronics module may be configured to apply a phase shift to each transmit antenna element of the plurality of transmit antenna elements 624 (FIG. 6) which changes as a function of time, which results in transmit beam 902 being scanned in azimuth.

A receive electronics module associated with receive array 620 is configured to electronically generate the plurality of receive beams 904. Although twelve receive beams 904 are illustrated in FIG. 9, in other examples, the receive electronics module may be configured to generate more or fewer receive beams 904 using receive array 620. For example, the receive electronics module associated with receive array 620 may be configured to generate at least two receive beams 904.

In some examples, the receive electronics module associated with receive array 620 is configured to scan, or steer, each of the plurality of receive beams 904 in the second illumination dimension (e.g., azimuth) in parallel with transmit beam 902. For example, the receive electronics module associated with receive array 620 may be configured to scan, or steer, each of the plurality of receive beams 904 in the second illumination dimension (e.g., azimuth) such that the plurality of receive beams 904 are scanned at the same rate and to corresponding locations so that the plurality of receive beams 904 are substantially always (e.g., always or nearly always) located within the area illuminated by transmit beam 902.

In some examples, the receive electronics module associated with receive array 620 may be configured to scan, or steer, the plurality of receive beams in the second illumination dimension (e.g., azimuth) by applying a phase shift to the signals received from each respective receive antenna element of the plurality of receive antenna elements 634. The receive electronics associated with receive array 620 then may process the phase-shifted signals as described below to produce phase-shifted and summed I and Q values for each row of receive antenna elements 634 in each respective quadrant of quadrants 632 (FIG. 6). For example, when each row of receive antenna elements 634 in each respective quadrant of quadrants 632 (FIG. 6) includes twelve elements, the receive electronics module associated with receive array 620 may be configured to generate a single phase-shifted and summed I value and a single phase-shifted and summed Q value for each row of twelve receive antenna elements 634 each time the receive array 620 is sampled.

The receive electronics module associated with receive array 620 also may be configured generate the plurality of receive beams 904 at predetermined first illumination dimension (e.g., elevation) positions by applying a complex beam weight to the phase-shifted and summed I and Q values for each row of each of quadrants 632 (FIG. 6). The phase-shifted and summed I and Q values determined by the receive electronics module for a single sample instance may be reused multiple times to generate the corresponding number or receive beams 904 at respective elevation positions. For example, to generate twelve receive beams 904, the receive electronics module associated with receive array 620 may apply twelve different complex beam weights to the phase-shifted and summed I and Q values for each row of each of quadrants 632 in twelve separate operations.

The plurality of complex beam weights may correspond to the number of receive beams 904. The values for each of the plurality of complex beam weights may be selected to result in the plurality of receive beams being generated at the respective predetermined elevation positions. As shown in FIG. 9, in some examples, the elevation positions of the plurality of receive beams 904 may be selected to substantially fully cover (e.g., fully cover or nearly fully cover) the elevation extent of the predetermined area 908 which is to be illuminated. In some examples, the adjacent ones of the plurality of receive beams 904 may partially overlap in elevation. In this way, the receive electronics associated with receive array 620 may generate a plurality of receive beams 904 at predetermined first illumination dimension (e.g., elevation) positions and scan, or steer, the plurality of receive beams 904 in the second illumination dimension (e.g., azimuth).

Additionally, because receive array 620 is conceptually (and, optionally, electrically) divided into quadrants 632, the receive electronics module associated with receive array 620 may be configured to generate monopulse tracking beams. This may be used to facilitate tracking of objects by radar system 610. By generating a transmit beam 902 and a plurality of receive beams 904, radar system 610 may perform monopulse tracking for each of receive beams 904, which may facilitate tracking multiple objects within predetermined area 908. For example, by digitally combining the I and Q values for the two left quadrants 632a and 632c together, digitally combining the I and Q values for the two right quadrants 632b and 632d, and determining the difference between I and Q values for the two left quadrants 632a and 632c and the I and Q values for the two right quadrants 632b and 632d, the receive electronics module may create an azimuth monopulse tracking beam. Similarly, in some examples, by digitally combining the I and Q values for the top two quadrants 632a and 632b, and digitally combining the I and Q values for the bottom two quadrants 632c and 632d, and determining the difference between I and Q values for the two top quadrants 632a and 632b and the I and Q values for the two bottom quadrants 632c and 632d, the receive electronics module may create an elevation monopulse tracking beam. In some examples, by digitally combining the I and Q values for respective rows of all 4 quadrants 632, a reference sum beam may be created for comparison to the azimuth and elevation monopulse tracking beams. This may permit an accurate phase comparison monopulse to be created for each of receive beams 904. Additionally, as each of FMCW arrays 612 is configured to generate a transmit beam 902 and a plurality of receive beams 904, which are scanned within a corresponding predetermined window, this may facilitate tracking of multiple objects by radar system 610.

In some examples, instead of being associated with a single receive array 620, the receive electronics module may be associated with multiple receive arrays 620. In other examples, a first portion of the receive electronics module may be associated with a single receive array, and a second portion of the receive electronics module may be associated with multiple receive arrays. For example, a portion of the receive electronics module that performs frequency downconversion and analog beam steering using phase shifts may be associated with a single array (e.g., receive array 620 of FIG. 6), and each receive array may include a respective portion that performs frequency downconversion and analog beam steering using phase shifts. Continuing this example, a portion of the receive electronics module applies complex beam weight to the phase-shifted and summed I and Q values for each row of each of quadrants 632 to form the receive beams at predetermined elevation positions and form monopulse tracking beams may be associated with multiple receive arrays. In some examples, then, different portions of the receive electronics module may be conceptually associated with different receive arrays 620 or multiple receive arrays, physically associated with different receive arrays 620, may be physically separate from receive arrays 620, or the like.

The following examples may illustrate one or more of the techniques of this disclosure.

Example 1

A system includes a radar device configured to transmit first X-band radar signals in a weather mode and receive first return X-band radar signals in the weather mode. The radar device is further configured to transmit second X-band radar signals in a landing mode and receive second return X-band radar signals in the landing mode. The system also includes processing circuitry configured to detect, in the weather mode, weather formations based on the first return X-band radar signals. The processing circuitry is further configured to determine, in the landing mode, a position of a transponder based on the second return X-band radar signals received by the radar device and determine a location of a runway based on the position of the transponder.

Example 2

The system of example 1, wherein the processing circuitry is further configured to determine an orientation of the runway based on the position of the first transponder and the position of the second transponder.

Example 3

The system of examples 1-2 or any combination thereof, wherein the processing circuitry is further configured to determine an altitude of the runway based on the position of the first transponder and the position of the second transponder.

Example 4

The system of examples 1-3 or any combination thereof, wherein the processing circuitry is further configured to determine a location of a threshold of the runway and an orientation of the threshold of the runway based on the position of the first transponder and the position of the second transponder.

Example 5

The system of examples 1-4 or any combination thereof, wherein the transponder is a first transponder, and the processing circuitry is further configured to determine, in the landing mode, a position of a second transponder based on the second return X-band radar signals received by the radar device. The processing circuitry is configured to determine the location of the runway by at least applying a hyperbolic navigation algorithm to the position of the first transponder and the position of the second transponder.

Example 6

The system of examples 1-5 or any combination thereof, wherein the runway includes a length that is at least twenty times longer than a width of the runway, and the processing circuitry is configured to determine the position of the first transponder at a first corner of the runway and the position of the second transponder at a second corner of the runway. The first corner is at a first end of the length of the runway, and the second corner is at the first end of the length of the runway.

Example 7

The system of examples 1-6 or any combination thereof, further including a memory device configured to store a known position of the transponder relative to a point on the runway, wherein the processing circuitry is configured to determine the location on the runway based on the known position of the transponder relative to the point on the runway.

Example 8

The system of examples 1-7 or any combination thereof, wherein the processing circuitry is configured to cause the radar device to transmit the first X-band radar signals and the second X-band radar signals at a first frequency. The processing circuitry is further configured to, in the weather mode, filter the first return X-band radar signals to identify signals at the first frequency. The processing circuitry is also configured to, in the landing mode, filter the second return X-band radar signals to remove signals at the first frequency. The processing circuitry is configured to, in the landing mode, filter the second return X-band radar signals to identify signals at a second frequency, wherein the second frequency is offset from the first frequency.

Example 9

The system of example 8, wherein the processing circuitry is configured to filter the second return X-band radar signals to identify signals at the second frequency in the landing mode by at least searching for the second return X-band radar signals at the second frequency.

Example 10

The system of examples 1-9 or any combination thereof, wherein the phased-array radar device includes receiver circuitry, and the processing circuitry is configured to search for the second return X-band radar signals at the second frequency by at least tuning the receiver circuitry to the second frequency.

Example 11

The system of examples 1-10 or any combination thereof, wherein the processing circuitry is further configured to cause, in the weather mode, the phased-array radar device to transmit the first X-band radar signals at the first frequency and tune, in the weather mode, the receiver circuitry to the first frequency to receive the first return X-band radar signals.

Example 12

The system of examples 1-11 or any combination thereof, wherein the second frequency is offset from the first frequency by less than five hundred megahertz.

Example 13

The system of examples 1-12 or any combination thereof, wherein the radar device is configured to transmit the first X-band radar signals and the second X-band radar signals at power levels of less than two hundred watts.

Example 14

The system of examples 1-13 or any combination thereof, wherein the radar device includes receiver circuitry, and a sensitivity of receiver circuitry of the radar device is greater than negative eighty dBm.

Example 15

The system of examples 1-14 or any combination thereof, wherein the system is configured to mount on a vehicle, and the processing circuitry is configured to determine the location of the runway by at least determining a position of the runway relative to the vehicle.

Example 16

The system of examples 1-15 or any combination thereof, further including a positioning device configured to receive positioning signals and a memory device configured to store a predetermined latitude of the runway and a predetermined longitude of the runway. The processing circuitry is further configured to determine a latitude of the system based on the positioning signals and determine a longitude of the system based on the positioning signals. The processing circuitry is configured to determine the location of the runway by at least determining a sensed latitude of the runway and a sensed longitude of the runway based on the latitude of the system, the longitude of the system, and the second return X-band radar signals. The processing circuitry is further configured to determine that a difference between the sensed latitude and the predetermined latitude exceeds a threshold distance and determine that a difference between the sensed longitude and the predetermined longitude exceeds the threshold distance. The processing circuitry is also configured to generate an alert in response to determining that the difference between the sensed latitude and the predetermined latitude exceeds the threshold distance or determining that the difference between the sensed longitude and the predetermined longitude exceeds the threshold distance.

Example 17

The system of examples 1-16 or any combination thereof, wherein the processing circuitry is configured to determine the location of the runway by at least applying a hyperbolic navigation algorithm to the position of the first transponder and the position of the second transponder.

Example 18

The system of examples 1-17 or any combination thereof, wherein the processing circuitry is configured to determine the location of the runway by at least applying a rho-rho navigation algorithm to the position of the first transponder and the position of the second transponder.

Example 19

The system of examples 1-18 or any combination thereof, wherein the processing circuitry is configured to determine the location of the runway by at least applying a hyperbolic navigation algorithm to the position of the first transponder and the position of the second transponder.

Example 20

The system of examples 1-19 or any combination thereof, wherein the system is configured to mount on a vehicle, wherein the system further includes an auto-pilot system configured to cause the vehicle to land in low-visibility conditions based on the location of the runway determined by the processing circuitry.

Example 21

A method includes causing a radar device to transmit first X-band radar signals in a weather mode and causing the radar device to receive first return X-band radar signals in the weather mode. The method also includes causing the radar device to transmit second X-band radar signals in a landing mode and causing the radar device to receive second return X-band radar signals in the landing mode. The method further includes detecting, in the weather mode, weather formations based on the first return X-band radar signals received by the radar device. The method includes determining, in the landing mode, a position of a transponder based on the second return X-band radar signals received by the radar device and determining a location of a runway based on the position of the transponder.

Example 22

The method of example 21, further including determining an orientation of the runway based on the position of the first transponder and the position of the second transponder.

Example 23

The method of examples 21-19 or any combination thereof, further including determining an altitude of the runway based on the position of the first transponder and the position of the second transponder.

Example 24

The method of examples 21-23 or any combination thereof, further including determining a location of a threshold of the runway and an orientation of the threshold of the runway based on the position of the first transponder and the position of the second transponder.

Example 25

The method of examples 21-24 or any combination thereof, wherein the transponder is a first transponder, and the method further includes determining, in the landing mode, a position of a second transponder based on the second return X-band radar signals received by the radar device. Determining the location of the runway includes applying a hyperbolic navigation algorithm to the position of the first transponder and the position of the second transponder.

Example 26

The method of examples 21-25 or any combination thereof, wherein the runway includes a length that is at least twenty times longer than a width of the runway. The method further includes determining the position of the first transponder at a first corner of the runway at a first end of the length of the runway and determining the position of the second transponder at a second corner of the runway at the first end of the length of the runway.

Example 27

The method of examples 21-26 or any combination thereof, further including storing a known position of the transponder relative to a point of the runway to the memory device. Determining the location on the runway is further based on the known position of the transponder relative to the point of the runway.

Example 28

The method of examples 21-27 or any combination thereof, further including causing, in the landing mode, the radar device to transmit the second X-band radar signals at a first frequency and filtering the first return X-band radar signals to identify signals at the first frequency in the weather mode. The method further includes filtering the second return X-band radar signals to remove signals at the first frequency in the landing mode and filtering the second return signals X-band radar to identify signals at a second frequency in the landing mode, wherein the second frequency is offset from the first frequency.

Example 29

The method of examples 21-28 or any combination thereof, wherein filtering the second return signals X-band radar to identify signals at the second frequency includes searching for the second return signals X-band radar at the second frequency in the landing mode.

Example 30

The method of examples 21-29 or any combination thereof, wherein filtering the second return X-band radar signals to identify signals at the second frequency includes tuning receiver circuitry of the phased-array radar device to the second frequency.

Example 31

The method of examples 21-30 or any combination thereof, causing, in the weather mode, the phased-array radar device to transmit the first X-band radar signals at the first frequency and tuning, in the weather mode, the receiver circuitry to the first frequency to receive the first return X-band radar signals.

Example 32

The method of examples 21-31 or any combination thereof, wherein searching for the return signals at the second frequency includes searching for the return signals at the second frequency that is offset from the first frequency by less than five hundred megahertz.

Example 33

The method of examples 21-32 or any combination thereof, wherein causing the radar device to transmit the first X-band radar signals includes causing the radar device to transmit the first X-band radar signals at a power level of less than two hundred watts. Causing the radar device to transmit the second X-band radar signals includes causing the radar device to transmit the second X-band radar signals at a power level of less than two hundred watts.

Example 34

The method of examples 21-33 or any combination thereof, wherein causing the radar device to receive the second return X-band radar signals includes causing the radar device to receive the second return X-band radar signals at a sensitivity of greater than negative eighty dBm.

Example 35

The method of examples 21-34 or any combination thereof, wherein determining the location of the runway includes determining a position of the runway relative to a vehicle including the radar device.

Example 36

The method of examples 21-35 or any combination thereof, further including causing a vehicle including the radar device to land in low-visibility conditions based on the location of the runway Example 37

The method of examples 21-36 or any combination thereof, wherein determining the location of the runway includes applying a hyperbolic navigation algorithm to the second return X-band radar signals.

Example 38

The method of examples 21-37 or any combination thereof, wherein determining the location of the runway includes applying a rho-rho navigation algorithm to the second return X-band radar signals.

Example 39

The method of examples 21-38 or any combination thereof, further including receiving, by a positioning device, positioning signals and storing a predetermined latitude of the runway and a predetermined longitude of the runway to a memory device. The method also includes determining a latitude of the positioning device based on the positioning signals and determining a longitude of the positioning device based on the positioning signals. Determining the location of the runway includes determining a sensed latitude of the runway and a sensed longitude of the runway based on the latitude of the positioning device, the longitude of the positioning device, and the second return X-band radar signals. The method further includes determining that a difference between the sensed latitude and the predetermined latitude exceeds a threshold distance, determining that a difference between the sensed longitude and the predetermined longitude exceeds the threshold distance, and generating an alert based on determining that the difference between the sensed latitude and the predetermined latitude exceeds the threshold distance or determining that the difference between the sensed longitude and the predetermined longitude exceeds the threshold distance.

Example 40

A device includes a computer-readable medium having executable instructions stored thereon, configured to be executable by one or more processors for causing the one or more processors to cause a radar device to transmit first X-band radar signals and cause the radar device to receive first return X-band radar signals. The instruction executable instructions further cause the one or more processors to cause the radar device to transmit second X-band radar signals and cause the radar device to receive second return X-band radar signals. The instruction executable instructions further cause the one or more processors to detect, in a weather mode, weather formations based on the first return X-band radar signals. The instruction executable instructions further cause the one or more processors to determine, in the landing mode, a position of a transponder based on the second return X-band radar signals received by the radar device and determine a location of a runway based on the position of the transponder.

Example 41

The device of example 40, wherein the executable instructions further cause the one or more processors to cause, in the landing mode, the radar device to transmit the second X-band radar signals at a first frequency and filter the first return X-band radar signals to identify signals at the first frequency in the weather mode. The executable instructions further cause the one or more processors to filter the second return X-band radar signals to remove signals at the first frequency in the landing mode and filter the second return X-band radar signals to identify signals at a second frequency in the landing mode, wherein the second frequency is offset from the first frequency.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid-state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 100 may include one or more memory devices, such as memory device 130, that include any volatile or non-volatile media, such as a RAM, ROM, non-volatile RAM (NVRAM), electrically erasable programmable ROM (EEPROM), flash memory, and the like. The one or more memory devices may store computer-readable instructions that, when executed by processing circuitry, cause the processing circuitry to implement the techniques attributed herein to processing circuitry.

Elements of processing circuitry 120 and/or memory device 130 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 120 and/or memory device 130 as in any of the examples herein may be implemented as a device, a system, an apparatus, and may embody or implement a method of determining a location of a runway.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A system comprising:
   a radar device configured to:
   transmit first X-band radar signals in a weather mode;
   receive return X-band radar signals reflected off weather formations in the weather mode;
   transmit second X-band radar signals at a first frequency in a landing mode; and
   receive, in the landing mode, reply X-band radar signals transmitted by a transponder at a second frequency in response to the second X-band radar signals transmitted by the radar device, wherein the second frequency is offset from the first frequency; and
   processing circuitry configured to:
   detect, in the weather mode, the weather formations based on the return X-band radar signals received by the radar device;
   determine, in the landing mode, a position of the transponder based on the reply X-band radar signals received by the radar device; and
   determine a location of a runway based on the position of the transponder.

2. The system of claim 1,
   wherein the transponder is a first transponder,
   wherein the processing circuitry is further configured to determine, in the landing mode, a position of a second transponder based on the reply X-band radar signals received by the radar device, and
   wherein the processing circuitry is configured to determine the location of the runway by at least applying a hyperbolic navigation algorithm to the position of the first transponder and the position of the second transponder.

3. The system of claim 2,
   wherein the runway includes a length that is at least twenty times longer than a width of the runway,
   wherein the processing circuitry is configured to determine the position of the first transponder at a first corner of the runway,
   wherein the processing circuitry is configured to determine the position of the second transponder at a second corner of the runway,
   wherein the first corner is at a first end of the length of the runway, and
   wherein the second corner is at the first end of the length of the runway.

4. The system of claim 1, further comprising a memory device configured to store a known position of the transponder relative to a point on the runway, wherein the processing circuitry is configured to determine the location on the runway based on the known position of the transponder relative to the point on the runway.

5. The system of claim 1, wherein the processing circuitry is configured to cause the radar device to transmit the first X-band radar signals and the second X-band radar signals at the first frequency, wherein the processing circuitry is further configured to:
   in the weather mode, filter the return X-band radar signals to identify signals at the first frequency;
   in the landing mode, filter the reply X-band radar signals to remove signals at the first frequency; and
   in the landing mode, filter the reply X-band radar signals to identify signals at the second frequency.

6. The system of claim 1,
   wherein the radar device is configured to transmit the first X-band radar signals at a power level of less than two hundred watts, and
   wherein the radar device is configured to transmit the second X-band radar signals at a power level of less than two hundred watts.

7. The system of claim 1,
   wherein the radar device includes receiver circuitry, and
   wherein a sensitivity of the receiver circuitry of the radar device is greater than negative eighty decibel-milliwatts (dBm).

8. The system of claim 1,
   wherein the system is configured to mount on a vehicle, and
   wherein the processing circuitry is configured to determine the location of the runway by at least determining a position of the runway relative to the vehicle.

9. The system of claim 1, wherein the system is configured to mount on a vehicle, wherein the system further comprises an auto-pilot system configured to cause the vehicle to land in low-visibility conditions based on the location of the runway determined by the processing circuitry.

10. A method comprising:
causing a radar device to transmit first X-band radar signals in a weather mode;
causing the radar device to receive return X-band radar signals reflected off weather formations in the weather mode;
causing the radar device to transmit second X-band radar signals at a first frequency in a landing mode;
causing the radar device to receive, in the landing mode, reply X-band radar signals transmitted by a transponder at a second frequency in response to the second X-band radar signals transmitted by the radar device, wherein the second frequency is offset from the first frequency;
detecting, in the weather mode, the weather formations based on the return X-band radar signals received by the radar device;
determining, in the landing mode, a position of the transponder based on the reply X-band radar signals received by the radar device; and
determining a location of a runway based on the position of the transponder.

11. The method of claim 10, wherein the transponder is a first transponder, the method further comprising determining, in the landing mode, a position of a second transponder based on the reply X-band radar signals received by the radar device, and wherein determining the location of the runway comprises applying a hyperbolic navigation algorithm to the position of the first transponder and the position of the second transponder.

12. The method of claim 11,
wherein the runway includes a length that is at least twenty times longer than a width of the runway,
wherein the method further comprises:
determining the position of the first transponder at a first corner of the runway at a first end of the length of the runway; and
determining the position of the second transponder at a second corner of the runway at the first end of the length of the runway.

13. The method of claim 10, further comprising storing a known position of the transponder relative to a point of the runway to a memory device, wherein determining the location on the runway is further based on the known position of the transponder relative to the point of the runway.

14. The method of claim 10, further comprising:
filtering the return X-band radar signals to identify signals at the first frequency in the weather mode;
filtering the reply X-band radar signals to remove signals at the first frequency in the landing mode; and
filtering the reply X-band radar signals to identify signals at the second frequency in the landing mode.

15. The method of claim 10,
wherein causing the radar device to transmit the first X-band radar signals comprises causing the radar device to transmit the first X-band radar signals at a power level of less than two hundred watts, and
wherein causing the radar device to transmit the second X-band radar signals comprises causing the radar device to transmit the second X-band radar signals at a power level of less than two hundred watts.

16. The method of claim 10, wherein causing the radar device to receive the reply X-band radar signals comprises causing the radar device to receive the reply X-band radar signals at a sensitivity of greater than negative eighty decibel-milliwatts (dBm).

17. The method of claim 10, wherein determining the location of the runway comprises determining a position of the runway relative to a vehicle including the radar device.

18. The method of claim 10, further comprising causing a vehicle including the radar device to land in low-visibility conditions based on the location of the runway.

19. A device comprising a computer-readable medium having executable instructions stored thereon, configured to be executable by one or more processors for causing the one or more processors to:
cause a radar device to transmit first X-band radar signals;
cause the radar device to receive return X-band radar signals reflected off weather formations;
cause the radar device to transmit second X-band radar signals at a first frequency in a landing mode;
cause the radar device to receive, in the landing mode, reply X-band radar signals transmitted by a transponder at a second frequency in response to the second X-band radar signals transmitted by the radar device, wherein the second frequency is offset from the first frequency;
detect, in a weather mode, the weather formations based on the return X-band radar signals received by the radar device;
determine, in the landing mode, a position of the transponder based on the reply X-band radar signals received by the radar device; and
determine a location of a runway based on the position of the transponder.

20. The device of claim 19, wherein the executable instructions further cause the one or more processors to:
filter the return X-band radar signals to identify signals at the first frequency in the weather mode;
filter the reply X-band radar signals to remove signals at the first frequency in the landing mode; and
filter the reply X-band radar signals to identify signals at the second frequency in the landing mode.

* * * * *